United States Patent [19]

Kaniwa et al.

[11] Patent Number: 5,359,473
[45] Date of Patent: Oct. 25, 1994

[54] TRACKING DEVICE

[75] Inventors: Kouji Kaniwa; Hideo Nishijima; Toshio Nakamoto, all of Ibaraki; Koichi Ono, Kanagawa, all of Japan

[73] Assignee: Hitachi, Ltd., Tokyo, Japan

[21] Appl. No.: 120,825

[22] Filed: Sep. 15, 1993

Related U.S. Application Data

[63] Continuation of Ser. No. 806,334, Dec. 13, 1991, abandoned.

[30] Foreign Application Priority Data

Dec. 14, 1990 [JP] Japan .................................. 2-402207
Mar. 1, 1991 [JP] Japan .................................. 3-035839

[51] Int. Cl.⁵ .......................................... G11B 5/584
[52] U.S. Cl. .............................. 360/77.14; 360/73.07
[58] Field of Search ............. 360/73.06, 77.15, 77.14, 360/73.07; 328/166, 167

[56] References Cited

U.S. PATENT DOCUMENTS

| | | | |
|---|---|---|---|
| 4,679,099 | 7/1987 | Edakubo | 360/10.2 |
| 4,816,940 | 3/1989 | Nagasawa et al. | 360/77.15 |
| 4,956,725 | 9/1990 | Kozuki et al. | 360/12 X |
| 4,972,190 | 11/1990 | Primeau et al. | 360/19.1 X |
| 4,999,722 | 3/1991 | Kozuki et al. | 360/77.15 |
| 5,251,079 | 10/1993 | Yamada et al. | 360/77.14 |

FOREIGN PATENT DOCUMENTS

| | | |
|---|---|---|
| 3841259 | 8/1989 | Fed. Rep. of Germany . |
| 59-36358 | 2/1984 | Japan . |
| 59-68862 | 4/1984 | Japan . |
| 59-75450 | 4/1984 | Japan . |

OTHER PUBLICATIONS

Lathi "Modern Digital and Analog Communication Systems" 1989 pp. 81–82.
Itoh et al. "Multi-Track PCM Audio Utilizing 8mm Video System" Aug. 1985 pp. 438–444.
Widrow et al. "Adaptive Noise Cancelling: Principles and Applications" Dec. 1975 pp. 1692–1716 *Proceedings of IEEE.*
U. Tietze et al., *Halbleiter-Schaltungstechnik,* Springer-Verlag, Berlin, 1989, pp. 791–798 (no translation).

*Primary Examiner*—Aristotelis Psitos
*Assistant Examiner*—James T. Wilson
*Attorney, Agent, or Firm*—Antonelli, Terry, Stout & Kraus

[57] ABSTRACT

A digital tracking device for use in a helical scan type magnetic recording and reproducing apparatus with an ATF system utilizing four-frequency pilot signals includes a sampling circuit which samples reproduced pilot signals with a frequency of a predetermined one of the four pilot signal frequencies, digital filter circuits for deriving aliasing signal components of the predetermined pilot signal produced by the sampling circuits, and a feedback circuit for feeding back a tracking error signal corresponding to signal levels of the aliasing signal components derived by the digital filter circuits to a magnetic tape drive system of the recording and reproducing apparatus.

33 Claims, 16 Drawing Sheets

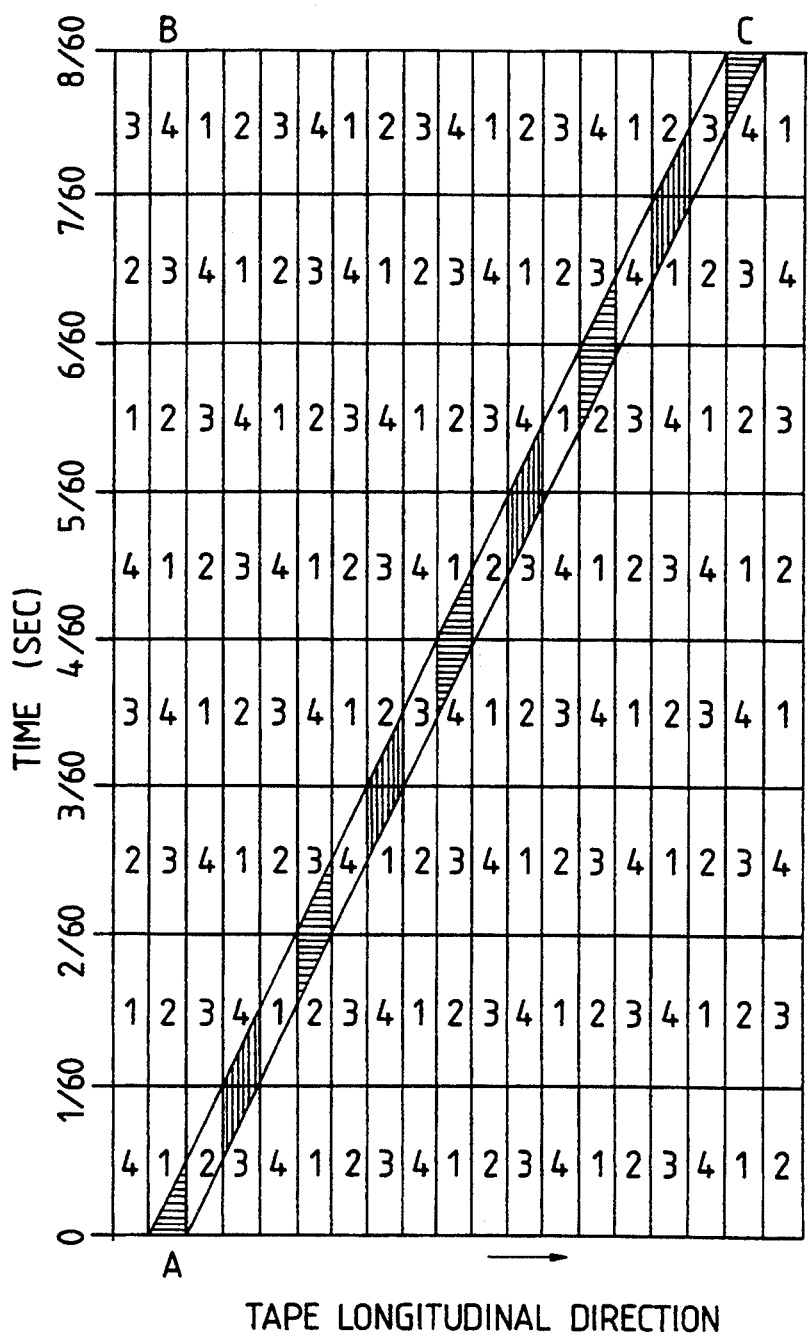
FIG. 14
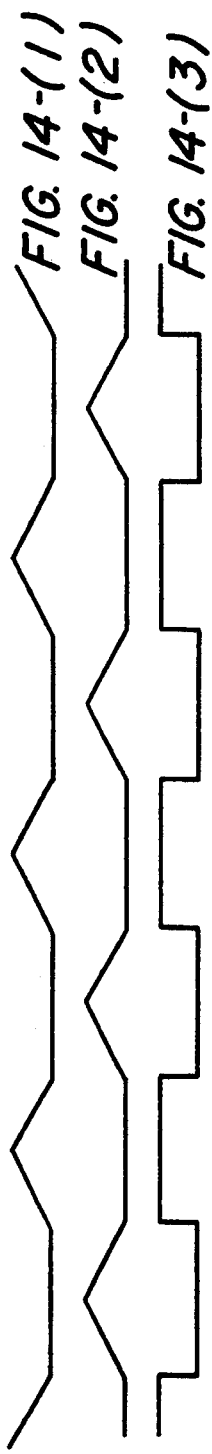

(a)

(b)

1

TRACKING DEVICE

This application is a continuation of U.S. patent application Ser. No. 806,334 filed on Dec. 13, 1991, now abandoned.

BACKGROUND OF THE INVENTION

The present invention relates to a tracking device for use in a helical scan type magnetic recording and reproducing apparatus, etc., and particularly to a tracking device of an ATF (Automatic Track Finding) system which uses four-frequency pilot signals recorded sequentially on helical tracks of a magnetic tape.

Prior art references related to such a tracking device are, for example, JP-A-59-36358, JD-A-59-68862 and JP-A-5975450.

A construction of a conventional tracking device of the ATF system is shown in FIG. 23, which corresponds to S. Itoh et al., "MULTI-TRACK PCM AUDIO UTILIZING 8 mm VIDEO SYSTEM", IEEE Transactions on Consumer Electronics, Vol. CE-31, No. 3, August 1985.

Before describing the conventional tracking device in detail, the four-frequency pilot signals will be described first.

As shown in FIG. 23, four-frequency pilot signals having frequencies f1 to F4 are recorded sequentially on respective tracks of a magnetic tape 1 together with information. These pilot signals are obtained by dividing an oscillator frequency of 378fH from a clock generator 15 by 58, 50, 36 and 40, respectively, by means of a clock frequency divider 17 and thus $f_1 \approx 6.5 fH$, $f_2 \approx 7.5 fH$, $f_3 \approx 0.5 fH$ and $f_4 \approx 9.5 fH$, where fH is a horizontal sync signal frequency of a television signal and 1fH = 15.73 kHz. Therefore, a difference in pilot signal frequency between adjacent tracks on the magnetic tape 1 is always substantially 1fH or 3fH, although it is actually 16.407 kHz (or 16.52 kHz) or 46.145 kHz (or 46.209 kHz), respectively.

Assuming that a magnetic head 2 is scanning a track recorded with the pilot signal frequency f2, the frequency difference between the pilot signal f1 on a preceding track and the pilot signal f2 is 1fH and that between the pilot signal f2 and a pilot signal f3 on a succeeding track is 3fH.

In FIG. 23, the magnetic tape 1 is transported by a capstan 22 driven by a capstan motor 23 which, in turn, is driven by a motor driver 24. Information recorded on the magnetic raise 1 is picked up by the magnetic head 2 and amplified suitably by a pre-amplifier 3. Thereafter, it is filtered by a LPF (Low Pass Filter) 4 to remove high frequency video or audio information components which are unnecessary for tracking control. Then, the reproduced pilot signals are amplified again to a suitable level by an AGC (Automatic Gain Control) amplifier 5 and supplied to a balanced modulator 28 which is a multiplier.

The balanced modulator 28 multiplies the reproduced pilot signal with a local pilot signal supplied from the clock frequency divider 17 to convert the pilot signals of both adjacent tracks into signals of 1fH and 3fH. When the magnetic head 2 scans the track recorded with the pilot signal f2, the clock frequency divider 17 provides a local pilot signal of f2 according to a control signal SEL supplied from an input terminal 19.

In this example, the reproduced pilot signals contain the pilot signal f2 on the track under scan and frequencies f1 and f3 of the pilot signals on the two tracks adjacent thereto. Therefore, an output of a multiplier 28 contains frequency components f2+f1 and f3+f2. The pilot signal f2 of the track under scan becomes a zero beat due to this multiplication.

The output of the multiplier 28 is supplied to 1fH-band pass filter (BPF) 8a and 3fH-BPF 9a from which frequency components $f_2 - f_1 \approx 1fH$ and $f_3 - f_2 \approx 3fH$ are derived, respectively. As to the 1fH and 3fH signals, the 1fH signal is obtained by frequency-conversion of the pilot signal f1 of the preceding track and the 3fH signal is obtained by frequency-conversion of the f3 pilot signal of the succeeding track. Therefore, by comparing the level of the fH signal with the level of the 3fH signal, it is possible to detect a position of the track which is currently being scanned by the magnetic head 2, that is, the tracking state.

The 1fH signal and the 3fH signal derived from the 1fH-BPF 8a and the 3fH-BPF 9a are supplied to a peak detector 11a or 12a through a switch 13a. The switch 13a is switched at a track scan period by a control signal HSW supplied from an input terminal 20. A variation of a relation between the pilot signals of the preceding and succeeding tracks and the frequency converted lfH and 3fH signals varies every track. That is, for example, in the state shown in FIG. 23, the pilot signal of the preceding track is converted into the 1fH signal and the pilot signal of the succeeding track is converted into the 3fH signal. However, when the magnetic head 2 is scanning the track recorded with the pilot signal f3, the local pilot signal supplied to the multiplier 28 is f3 and therefore the pilot signal f2 reproduced from the preceding track becomes $f_3 - f_2 \approx 3fH$ and the pilot signal f4 reproduced from the succeeding track becomes $f_4 - f_2 \approx 1fH$. Therefore, the relation between the pilot signals of the preceding and the succeeding tracks and the frequency converted lfH and 3fH signals becomes reversed compared with the case shown in FIG. 23. The switch 13a functions to cancel out such variation of the relation between the pilot signals of the preceding and succeeding tracks and the 1fH and 3fH signals.

The 1fH and 3fH signals switched at the track scan period are supplied to the peak detector 11a or 12a. The peak detectors 11a and 12a detect peak levels of the 1fH and 3fH signals, respectively, and supply them to a subtracter 14a. The subtracter 14a provides a difference therebetween, that is, a tracking error signal, and supplies it to an adder 27. The adder 27 adds it to a speed error signal supplied from a capstan speed control circuit 26 and a result is supplied to the motor driver 24. The motor driver 24 supplies electric mower corresponding to the sum of the tracking error signal and the speed error signal to the capstan motor 23 to drive the latter. Thus, the capstan 22 transports the magnetic tape 1 at a predetermined speed in a predetermined phase.

The capstan speed control circuit 26 measures a period of a CFG signal produced proportionally to rotation of the capstan 22 and outputs a difference between the measured period and a desired period as the speed error signal to be supplied to adder 27.

The clock frequency divider 17 for producing the local pilot signals divides a clock supplied from the source clock generator 15 which includes a stable quartz oscillator 16 and produces the local pilot signals f1 to f4 sequentially at the track scan period according to the control signal SEL. The AGC amplifier 5 functions to make the reproduced pilot signal level constant such that the tracking error signal does not substantially vary due to variation of the level of the reproduced pilot signals.

In FIG. 23, signals to be processed by the multiplier 28 for frequency-converting the reproduced pilot signals, the BPFs 8a and 9a for deriving the lfH and 3fH signal components, the peak detectors 11a and 12a and the comparator 14a for comparing the lfH and 3fH signals are analog signals. Therefore, such an ATF analog tracking control system can not be combined easily with a tape speed control system and a speed and phase control system for a drum on which magnetic heads are mounted, both of which are currently digital or software-implemented. In other words, since the ATF tracking control system operates in an analog manner, it is very difficult to highly integrate the ATF tracking control system with other digital control systems. Further, the characteristics of the BPFs for deriving the lfH and 3fH signals which affect the performance of the ATF tracking control system substantially may be degraded due to variation of constitutional Darts and their time-dependent changes when they operate in analog manner.

SUMMARY OF THE INVENTION

An object of the present invention is to provide a tracking device of a helical scan type recording and reproducing apparatus, which is free from degradation of performance due to variations of constitutional parts and their time-dependent changes.

Another object of the present invention is to provide a tracking device having a digital ATF tracking control system constituted with a minimum number of components, such as a multiplier for frequency-converting reproduced pilot signals, BPFs for deriving lfH and 3fH signal components, peak detectors and a comparator for comparing the lfH signal with the 3fH signal, etc.

A further object of the present invention is to provide a tracking device which can be easily integrated with other digital control systems of the helical scan type recording and reproducing apparatus.

According to a first aspect of the present invention, the tracking device of the present invention comprises low pass filter (LPF) means for removing high frequency components such as a video signal, etc., which are unnecessary for tracking control of a reproduced signal to derive pilot signals, sample and hold means for sampling and holding each reproduced pilot signal at a predetermined pilot signal period, analog to digital (AD) converter means for converting the sample-hold signal into a digital signal, first and second digital filters for deriving aliasing signal components of the first and second predetermined pilot signals produced by the sampling and holding, first and second level detector means for detecting levels of the aliasing signals derived by the digital filters and subtraction means for detecting a difference between outputs of the first and second detection means, an output of the subtraction means being fed back to a tape driving means of the recording and reproducing apparatus.

The LPF means derives only the pilot signals necessary for tracking control.

The sample and hold means and the AD converter means frequency-convert the reproduced pilot signals and further convert the converted reproduced pilot signals into digital signals by positively utilizing the fact that, in sampling, a signal whose frequency exceeds half of a sampling frequency is detected as an aliasing signal.

The first and second digital filters derive, from the frequency-converted digital reproduced pilot signals, the reproduced pilot signals from a track preceding and a track succeeding a track under scan. A track currently under scan will be referred to as a "main track" and preceding and succeeding tracks with respect to the main track will be referred to as "adjacent tracks" hereinafter.

The first and second detection means detect levels of the reproduced pilot signals from the adjacent tracks, that is, a tracking state.

The subtraction means produces a tracking error signal by obtaining a difference in level between the pilot signals reproduced from the adjacent tracks. Therefore, in processing the pilot signals digitally, it is possible to not only set the sampling frequency to a frequency equal to one of the frequencies of the pilot signals during AD conversion but also to convert the pilot signals from the adjacent tracks into a lfH or 3fH signal.

Further, it is possible to construct the BPFs for deriving the lfH and 3fH components which affect the performance of the ATF tracking control system substantially and the peak detectors with digital circuits and therefore it is possible to avoid degradation of characteristics thereof due to variations of constitutional parts thereof and their time-dependent changes which are serious problems in analog signal processing.

According to a second aspect of the present invention, the tracking device of the present invention comprises LPF means for removing high frequency components such as a video signal, etc., which are unnecessary for tracking control of a reproduced signal and deriving pilot signals, AD converter means for converting each reproduced pilot signal into a digital signal at a sampling frequency which is a common multiple of different frequencies of four-frequency pilot signals, sampling data thinning means for converting an output of the AD conversion means into a sampling frequency which is not more than twice a frequency of a predetermined one of the pilot signals, a digital filter for deriving, from thinned sampling data, aliasing signal components of the pilot signals reproduced from the predetermined tracks, level detection means for detecting levels of the aliasing signals derived by the digital filters and arithmetic operation means for producing a tracking error signal from an output of the detection means, an output of the operation means being fed back to a tape driving means of the recording and reproducing apparatus.

In a tracking device of an ATF system in a magnetic recording and reproducing apparatus having an extra long time continuous recording mode of operation in which a tape speed during recording is lower than a normal speed, it is necessary, in a reproducing mode, to determine a recording mode while performing tracking control. In the present invention, in addition to the AD conversion means, the sampling data thinning means, the digital filter and the level detection means, frequency detection means is further provided to detect a level difference signal between pilot signals reproduced from adjacent tracks and the tape speed in recording is determined from the frequency of the level difference signal.

The LPF means derives only the pilot signals necessary for tracking control.

The AD converter means and the sampling data thinning means frequency-convert the reproduced pilot signals by positively utilizing the fact that, in sampling, a signal whose frequency exceeds half of a sampling frequency is detected as an aliasing signal.

The digital filter derives, from the digital reproduced pilot signals which are aliasing signals, the reproduced pilot signals from adjacent tracks. The level detection means detects levels of the reproduced pilot signals from the adjacent tracks, that is, a tracking state.

The subtraction means produces a tracking error signal by obtaining a difference in level between the pilot signals reproduced from the adjacent tracks. Therefore, in processing the pilot signals digitally, it is possible to convert the pilot signal having four frequencies into 1fH or into 1fH and 3fH by making the sampling frequency during the AD conversion constant and thinning the sampling data at a predetermined rate.

Further, it is possible to construct the BPFs for deriving the 1fH and 3fH components which affect the performance of the ATF tracking control system substantially and the level detectors with digital circuits and therefore it is possible to avoid degradation of characteristics thereof due to variations of constitutional parts thereof and their time-dependent changes which are serious problems in analog signal processing.

Further, the frequency detection means determines the tape speed during recording on the basis of the fact that the level difference signal frequency $f_p$ of the pilot signals reproduced from the preceding and the succeeding tracks can be represented by $$f_{pp} = |m - l| \times 15 \quad \text{(Hz)}$$

where the tape speed in reproduction is m times that on recording.

The above-mentioned and other objects, features and advantages of the present invention will become more apparent from the following detailed description when taken in conjunction with the accompanying drawings.

BRIEF DESCRIPTION OF THE DRAWINGS

FIG. 14 illustrates a track pattern and a locus of a head;

FIGS. 14-(1), 14-(2), and 14-(3) show signals produced the track pattern and head locus in FIG. 14;

DETAILED DESCRIPTION OF THE PREFERRED EMBODIMENTS

Figure 1:
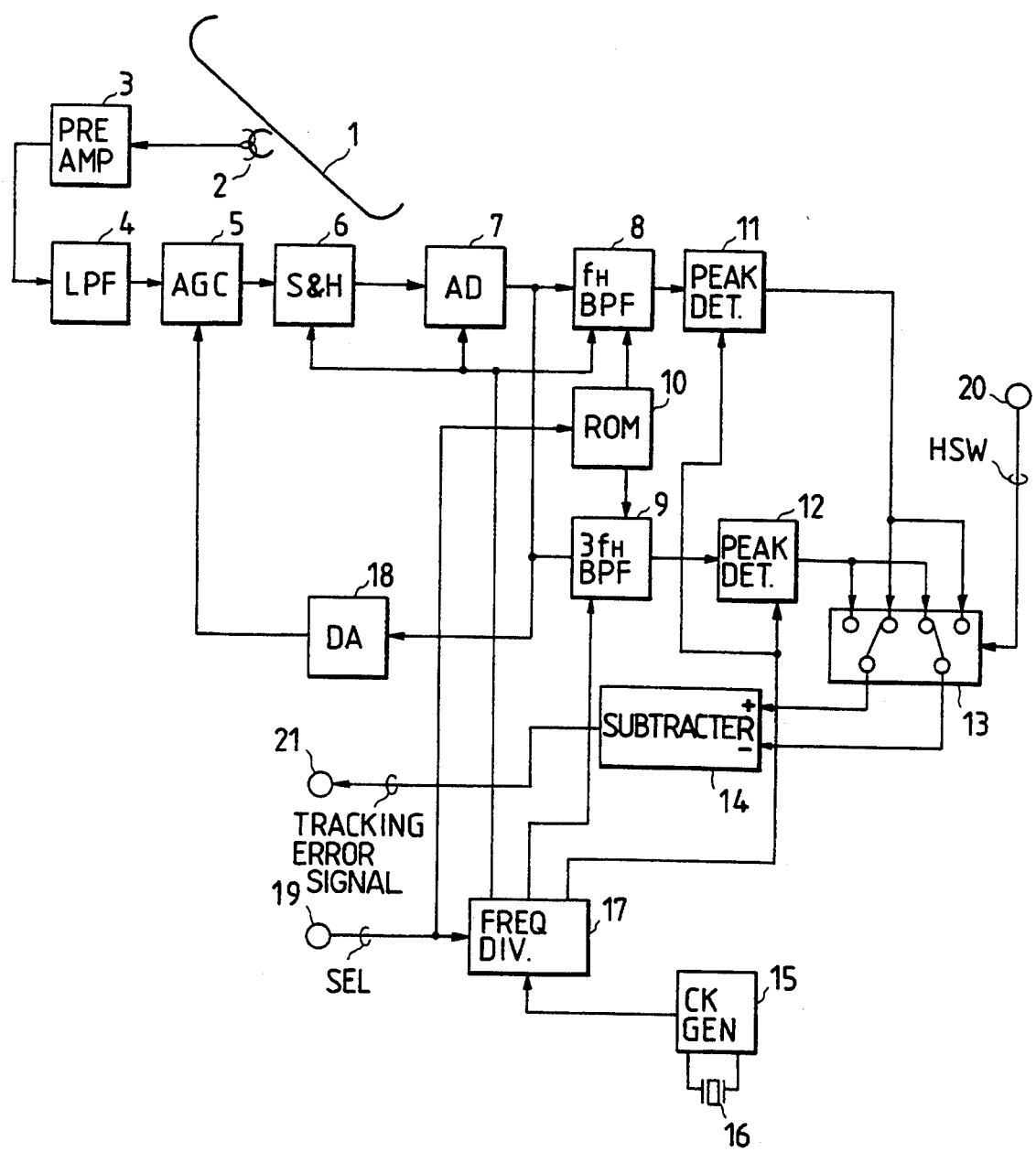
FIG. 1 is a block diagram of a tracking device according to an embodiment of the present invention.

FIG. 1 is a block circuit diagram of a tracking device of an ATF system, according to a first embodiment of the present invention in which a capstan system and a speed control system are omitted for simplicity of illustration.

In FIG. 1 a signal reproduced from a magnetic tape 1 through a head 2 is amplified by a pre-amplifier 3 and then supplied to a LPF 4. High frequency components of the reproduced signal such as video or audio information which are unnecessary tracking control are removed in the LPF 4. Then, the reproduced signal is amplified to a suitable level by an AGC amplifier 5 and supplied to a sample and hold circuit 6.

The sample and hold circuit 6 samples the reproduced signal at each of pilot signal frequencies f1 to f4 supplied from a clock frequency divider 17 and holds them. With this sampling and holding, aliasing frequencies of the respective reproduced pilot signals become as shown in the following Table 1:

TABLE 1

| sample signal | reproduced pilot signal | | | |
| --- | --- | --- | --- | --- |
| | f1 | f2 | f3 | f4 |
| f1 | 0 | 1fH | 2.5fH | 3fH |
| f2 | 1fH | 0 | 3fH | 2fH |
| f3 | 4fH | 3fH | 0 | 1fH |
| f4 | 3fH | 2fH | 1fH | 0 |

Figure 2:
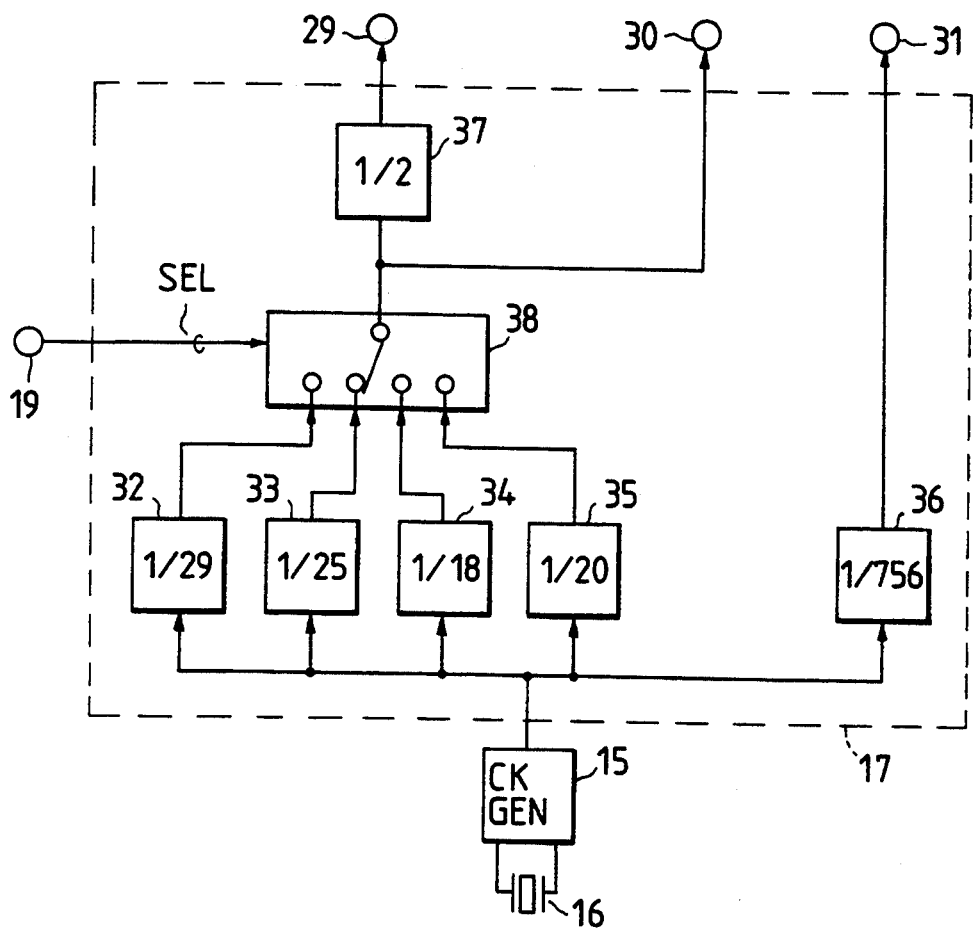
FIG. 2 is a block circuit diagram of a clock frequency divider of the tracking device in FIG. 1.

The clock frequency divider 17 may have a construction as shown in FIG. 2. In FIG. 2, the clock frequency divider 17 comprises a 1/29 frequency divider 32, a 1/25 frequency divider 33, a 1/18 frequency divider 34, a 1/20 frequency divider 35 and a 1/756 frequency divider 36, all of which have input terminals connected to a clock generator 15 including a stable oscillator 16 such as a quartz oscillator. The clock frequency divider 17 further comprises a ½ frequency divider 37 and a switch 38. Outputs of the frequency dividers 32, 33, 34 and 35 are connected to respective inputs of the switch 38. The output of the switch 38 is connected directly to a clock output terminal 30 and through the frequency divider 37 to another clock output terminal 29. An output of the frequency divider 36 is connected to a third clock output terminal 31.

The frequency dividers 32 to 36 divide a clock frequency (378 fH) from the clock generator 15 by the predetermined dividing ratios. The output frequency of any of the frequency dividers 32 to 35 is provided at the clock output terminal 30 as it is and is provided divided in half at the clock output terminal 29 through the divider 37 as a local pilot signal frequency f1, f2, f3 or f4. The selection of a pilot signal frequency is performed by switching the switch 38 sequentially from f1 to f2 to f3 and then to f4 according to a control signal SEL supplied from a control signal input terminal 19 at a track scanning period.

The clock output terminal 29 of the clock frequency divider 17 is connected to the sample and hold circuit 6, an AD converter 7 and a lfH-BPF 8. The output terminal 30 is connected to a 3fH-BPF 9 and the output terminal 31 is connected to peak detectors 11 and 12.

Reproduced pilot signals sampled and held at the pilot signal frequencies f1 to f4 are converted into digital signals by the AD converter 7 and then supplied to the lfH-BPF 8, the 3fH-BPF 9 and a DA converter 18.

Figure 3:
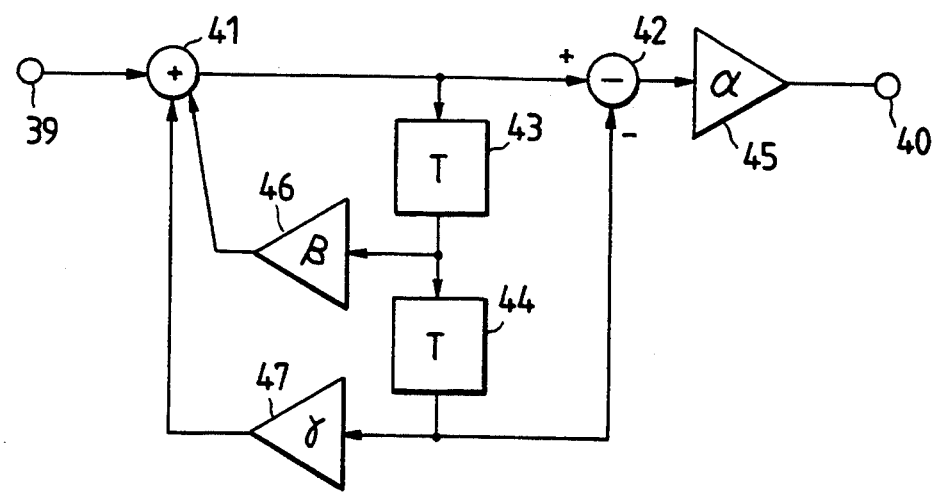
FIG. 3 is a block circuit diagram of a digital BPF of the tracking device.

In this embodiment, each of the lfH-BPF 8 and the 3fH-BPF 9 may be constituted with an IIR type digital filter as shown in FIG. 3 which is equivalent to a quadratic analog bandpass filter. In FIG. 3, the BPF comprises an adder 41 having three inputs, one of which is connected to an input terminal 39 for receiving the output of the AD converter 7, a subtracter 42, coefficient circuits, i.e., multipliers, 45, 46 and 47 and delay circuits 43 and 44. The digital filter can be designed by performing Z transformation from a transfer function of an analog filter. A transfer function of a quadratic analog band-pass filter is represented by the following equation:

$$H(s) = \frac{c}{S^2 + aS + b} \quad [1]$$

The transfer function represented by the equation is bilinear-transformed, resulting in the following equation:

$$H(z) = \alpha \frac{1 - Z^{-2}}{1 - \beta Z^{-1} - \gamma Z^{-2}} \quad [2]$$

where $$\alpha = \frac{2T}{4 + 2aT + bT^2}$$

$$\beta = \frac{2(4 - bT^2)}{4 + 2aT + bT^2}$$

$$\gamma = \frac{-(4 - 2aT + bT^2)}{4 + aT + bT^2}$$

and T is a sampling period in the digital filter.

The block circuit shown in FIG. 3 realizes the transfer function shown by the equation 2. In the equation 2, in order to obtain the same filter characteristics even when a sampling period (T) of the digital filter varies, it is necesssary to change the coefficients of the coefficient circuits in accordance with the samolina period (T). Thus, in order to obtain desired filter characteristics when the sampling frequency is changed to any of the pilot signal frequencies f1 to f4, coefficients corresponding to the respective sampling frequencies are stored in a memory 10 (FIG. 1).

Figure 4:
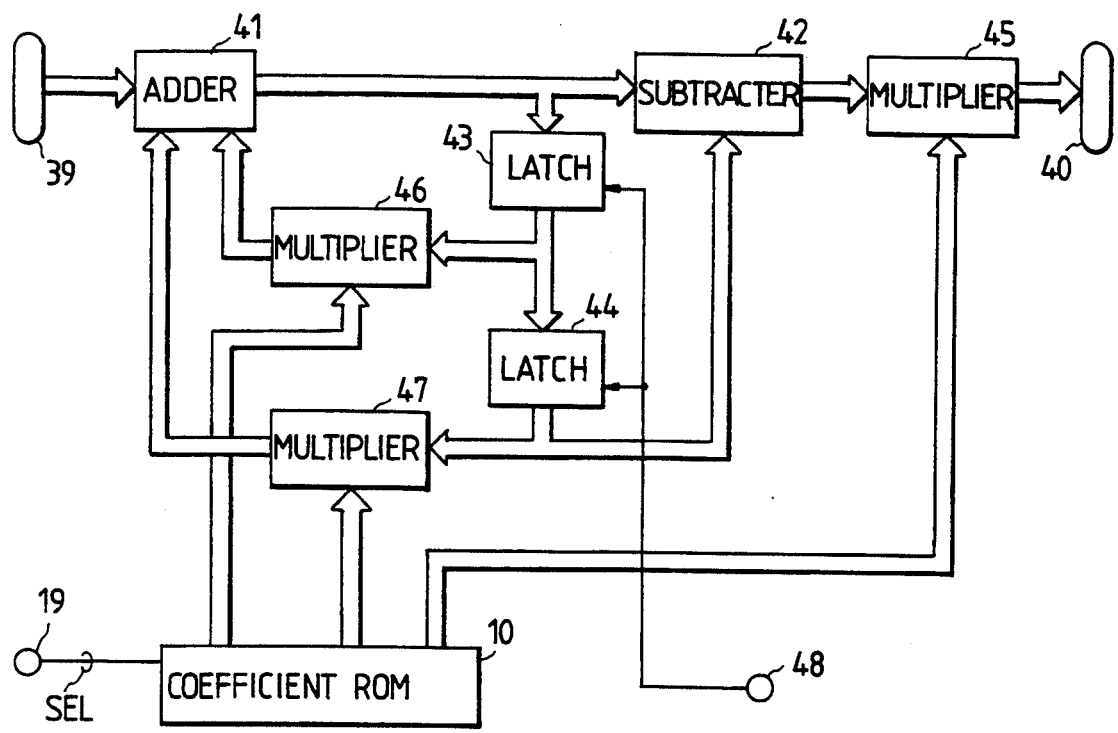
FIG. 4 is a block circuit diagram showing an example of the digital BPF shown in FIG. 3.

FIG. 4 shows a construction of a digital BPF in FIG. 3 in more detail using coefficients corresponding to the respective sampling frequencies. In FIG. 4, the delay circuits 43 and 44 in FIG. 3 are constituted with latch circuits which latch data in response to a sampling clock supplied from an input terminal 48. The respective multiplier circuits (coefficient circuits) 45 to 47 multiply coefficients $\alpha$, $\beta$ and $\gamma$ (produced from the memory 10 corresponding to the respective sampling frequencies with input data according to the control signal SEL supplied from the input terminal 19. A list of coefficients stored in the memory 10 is shown in Table 2.

TABLE 2

| sampling frequency f | 1fH-BPF | | | 3fH-BPF | | |
|---|---|---|---|---|---|---|
| | $\alpha$ | $\beta$ | $\gamma$ | $\alpha$ | $\beta$ | $\gamma$ |
| f1 | $\alpha_{1-1}$ | $\beta_{1-1}$ | $\gamma_{1-1}$ | $\alpha_{2-1}$ | $\beta_{2-1}$ | $\gamma_{2-1}$ |
| f2 | $\alpha_{1-2}$ | $\beta_{1-2}$ | $\gamma_{1-2}$ | $\alpha_{2-2}$ | $\beta_{2-2}$ | $\gamma_{2-2}$ |
| f3 | $\alpha_{1-3}$ | $\beta_{1-3}$ | $\gamma_{1-3}$ | $\alpha_{2-3}$ | $\beta_{2-3}$ | $\gamma_{2-3}$ |
| f4 | $\alpha_{1-4}$ | $\beta_{1-4}$ | $\gamma_{1-4}$ | $\alpha_{2-4}$ | $\beta_{2-4}$ | $\gamma_{2-4}$ |

In Table 2, a set of 24 coefficients $\alpha$, $\beta$ and $\gamma$ are listed for the 1fH-BPF when the sampling frequency is any of pilot signal frequencies f1 to f4 and for the 3fH-BPF when the sampling frequency is twice any of the pilot signal frequencies f1 to f4.

When the sampling frequency equals the pilot signal frequency f1 (about 6.5 fH), the frequency of the 3fH signal component is close to half of the sampling frequency and there are only two sampling points within one period of the 3fH signal. Therefore, a precise peak detection to be performed in the peak detector 12 takes a long time as will be described later. This is because data at the sampling points are not always a peak level value.

Figure 5:
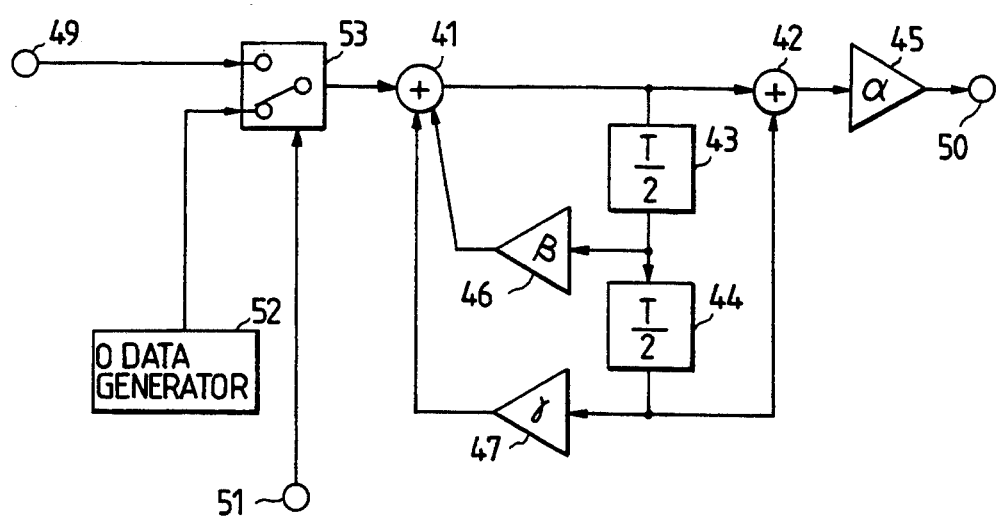
FIG. 5 is a block circuit diagram showing a 3fH BPF.

Therefore, in the embodiment shown in FIG. 1, the 3fH-BPF 9 is constructed as shown in FIG. 5 which differs from FIG. 3 in that a delay time of each of delay circuits 43 and 44 is made half of that of the delay circuits in FIG. 3. The delay circuits 43 and 44 are latched at a frequency which is twice the sampling clock frequency. A 0 data generator 52 is provided to generate 0 data which is supplied to the adder 41 through a switch 53, which is switched at a period of twice the sampling clock frequency supplied from an input terminal 51, alternatively with output data of the AD converter 7. Thus, the 3fH-BPF 9 derives the 3fH signal at a frequency period twice the sampling frequency and outputs it to the peak detector 12 at the frequency period twice the sampling frequency. The peak detectors 11 and 12 detect peak levels of the 1fH signal and the 3fH signal, respectively, and supply them to a switch 13 (FIG. 1).

Figure 6:
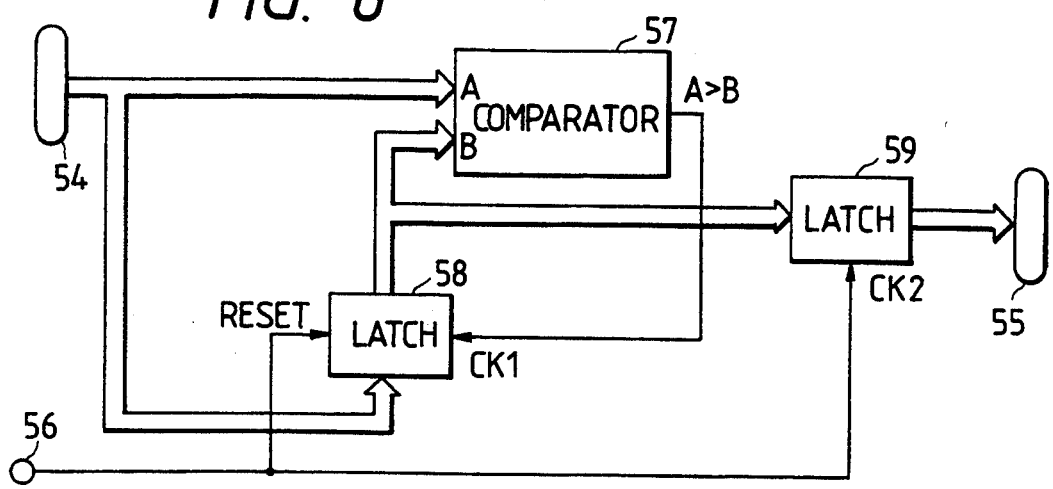
FIG. 6 is a block circuit diagram of a peak detector of the tracking device in FIG. 1.

An example of the peak detector 11 or 12 is shown in FIG. 6. In FIG. 6, peak data A of the 1fH or 3fH signal supplied from an input terminal 54 is supplied to a comparator 57 and a latch circuit 58. The comparator 57 compares the input data A with latch data B from the latch circuit 58 and, when the input data A is larger than the latch data B, provides a latch clock CK1 to the latch circuit 58. The latch circuit 58 is reset at a period of a clock CK2 supplied thereto through an input terminal 56 while another latch circuit 59 latches the latch data of the latch circuit 58 immediately before the latter is reset. Therefore, the latch circuit 59 can latch the maximum value or peak data of the 1fH or the 3fH signal at the clock period CK2 supplied through the input terminal 56. The clock CK2 supplied from the input terminal 56 is obtained from the frequency divider 36 of the clock frequency divider 17 shown in FIG. 2.

Figure 23:
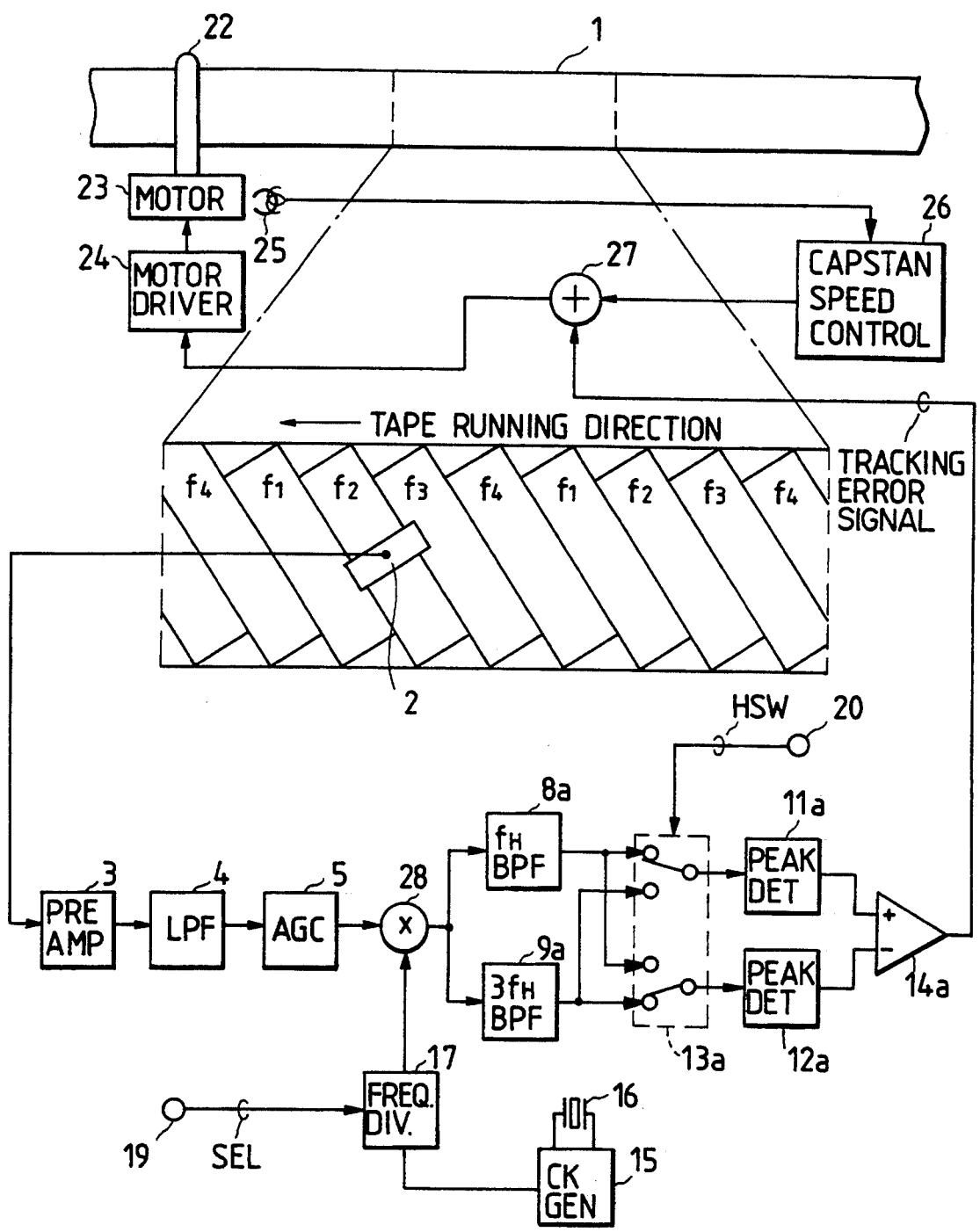
FIG. 23 is a block circuit diagram showing a construction of a conventional tracking device.

The peak data of the 1fH and 3fH signals thus detected by the peak detectors 11 and 12 are supplied to the switch 13. The switch 13 is switched at the track scan period by the control signal HSW supplied from the input terminal 20 and having a frequency (=30 Hz) of a video frame synchronized with the scan of the rotary head. As mentioned previously with respect to the prior art shown in FIG. 23, the switch 13 functions to cancel out the variation of relation between the pilot signals of the adjacent tracks and the frequency-converted 1fH and 3fH signals every track.

The peak signals of the 1fH signal and the 3fH signal which are switched at the track scan period are supplied to a subtracter 14. The subtracter 14 produces a difference in peak level between the 1fH signal and the 2fH signal and provides the difference to an output terminal 21 as a tracking error signal. The tracking error signal at the output terminal 21 is added to a speed error signal supplied from a capstan speed control circuit similar to the capstan speed control circuit 26 shown in FIG. 23 and the sum is supplied to a motor driver also similar to the motor driver 24 in FIG. 23.

The motor driver drives the capstan motor with electric power corresponding to the sum of the tracking error signal and the speed error signal. Therefore, the magnetic tape 1 is transported at a predetermined speed and in a predetermined phase. The DA converter 18 functions to make the level of the reproduced pilot signal constant so that the tracking error signal is not substantially changed due to a level variation of the reproduced pilot signal by converting the tracking error signal into an analog signal and feeding it back to the AGC amplifier 5.

As described, according to this embodiment, it is possible, in processing the pilot signal having a frequency of 102 kHz to 164 kHz digitally, to set the sampling frequency in the AD conversion to a frequency equal to the pilot signal frequency, which is advantageous in all aspects including operation speed, power consumption and circuit construction, etc., of the AD converter. Further, since it is possible to convert the pilot signals reproduced from both adjacent tracks into the 1fH and 3fH signals, there is no need of providing a multiplier for frequency conversion and thus the size of the circuit construction can be minimized in addition thereto, the peak detectors and the BPFs for deriving the 1fH and 3fH signals which affect the performance of the ATF tracking control system considerably can be realized with digital circuits so that it is possible to prevent the characteristics thereof from being degraded due to variations of constitutional parts thereof or their time-dependent changes.

An example of a recording and reproducing apparatus which employs the ATF tracking control using the four-frequency pilot signals is a helical scan VTR called 8 mm Video as disclosed in the article of S. Itoh et al. mentioned previously.

In such 8 mm Video, a helical track is longitudinally divided into two tracks on one of which a video signal is recorded and on the other of which a time axis compressed PCM audio signal is recorded. Since the track on which the PCM audio signal is to be recorded is about one fifth the width of the video signal recording track, it is possible to further divide the video signal recording track into five tracks and to record a time axis compressed PCM audio signal in each of the subdivided tracks. Therefore, a total of 6 tracks for recordation of a PCM audio signal are provided, making extra long time continuous recording and/or reverse playback of recorded information possible. Such a 6-track PCM audio signal recording system is called the Multi-Track PCM Audio Recording System.

Figure 7:
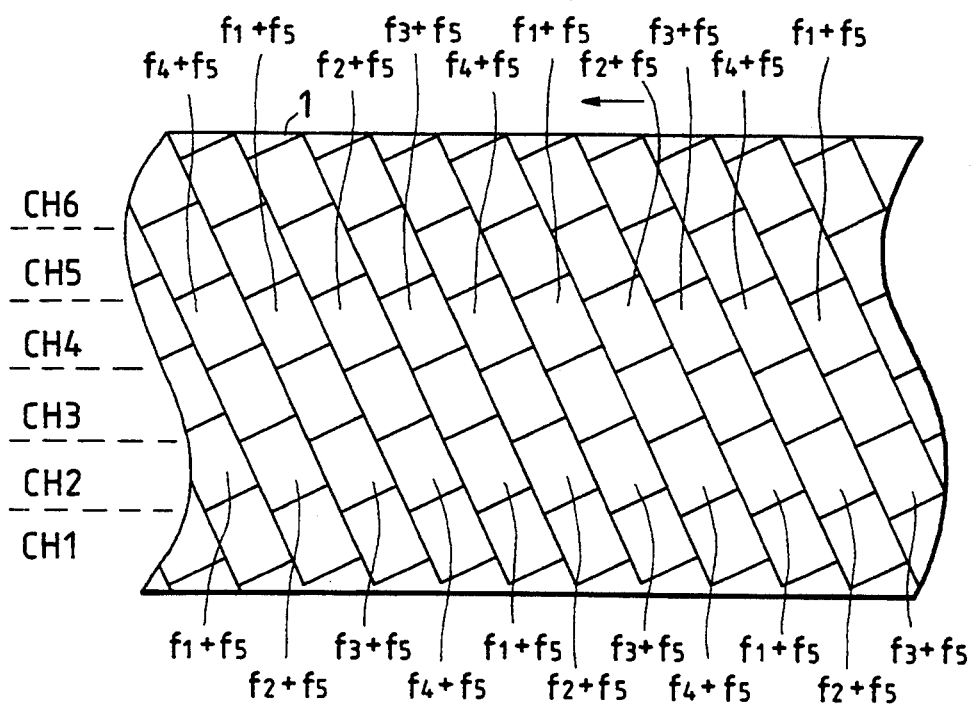
FIG. 7 shows a multi-track PCM audio recording pattern.
Figure 8:
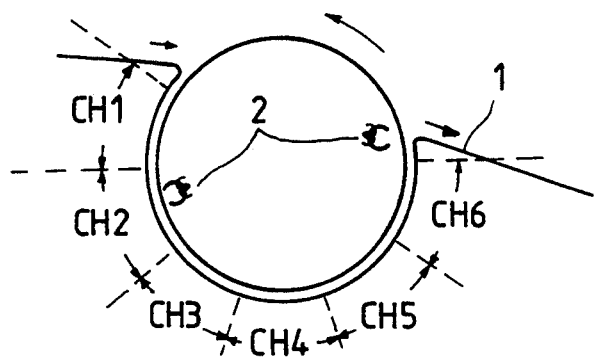
FIG. 8 illustrates a loaded state of a magnetic tape.

FIG. 7 shows an example of a tape pattern recorded using the Multi-Track PCM Audio Recording System and FIG. 8 illustrates an allocation of respective tracks in a tape loaded state in the system. In FIGS. 7 and 8, it is usual that a track CH1 is allocated to PCM audio signal recordation and tracks CH2 to CH6 are allocated to video signal recordation in the MultiTrack PCM Audio Recording System, however, in order to discriminate a usual video signal recordation, a pilot signal f5 (378/26 fH ≈ 14.5 fH) is recorded in each of the tracking control pilot signals f1 to f4. Therefore, in a VTR such as 8 mm Video in which the multi-track-Track PCM Audio Recording System is included, it is necessary to discriminate the Multi-Track PCM audio recording from the usual video signal recording by means of the pilot signal f5.

Figure 9:
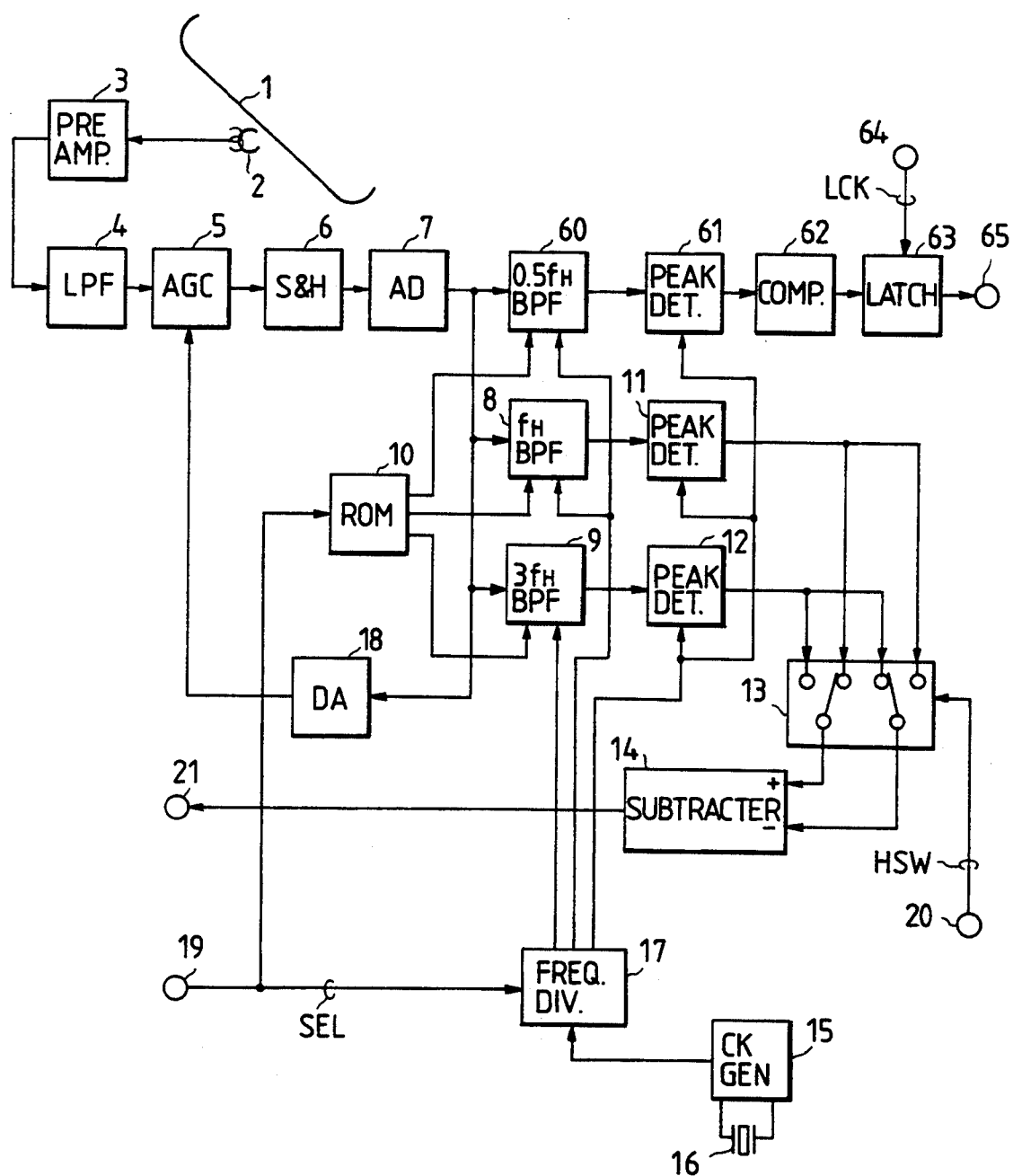
FIG. 9 is a block circuit diagram of a tracking device according to a second embodiment of the present invention.

FIG. 9 shows a second embodiment of the present invention which has a discrimination function by means of the pilot signal f5. In FIG. 9, a 0.5fH-BPF 60, a peak detector 61 associated therewith, a comparator 62, and a latch circuit 63 are added to the first embodiment shown in FIG. 1.

Before describing an operation of the tracking device shown in FIG. 9, the nature of the discriminating pilot signal f5 will be described. As mentioned above, the pilot signal f5 has a frequency of 378/26 fH ≈ 14.5 fH. Table 3 shows aliasing signal frequencies when the signal f5 is sampled at each of the pilot signals f1 to f4.

TABLE 3

| sampling frequency | f1 | f2 | f3 | f4 |
|---|---|---|---|---|
| aliasing frequency | 1.5fH | 0.5fH | 4fH | 4.5fH |

The aliasing frequencies shown in Table 3 are not coincident with those of the pilot signals f1 to f4 shown in the Table 1 except the aliasing frequency of 4fH when the pilot signal f5 is sampled with the pilot signal frequency f3, and therefore it is possible to separate them. However, when all aliasing frequencies obtained by sampling the pilot signal f5 with the other pilot signals f1, f2 and f4 are to be separately derived by BPFs, the BPFs become complicated. Further, the presence or absence of the pilot signal f5 is to discriminate between different recording systems, and therefore it is not always necessary to perform such discrimination at every field (every track scan).

In the embodiment in FIG. 9, the discrimination of the Multi-Track PCM audio recording based on the presence and absence of the pilot signal f5 is performed by detection of the 0.5fH signal when sampled with the pilot signal f2.

In FIG. 9, a reproduced signal detected from the magnetic tape 1 by the magnetic head 2 is amplified by the preamplifier 3 and then supplied to the LPF 4. In the LPF 4, high frequency components of the reproduced signal which are unnecessary for tracking control are removed to derive reproduced pilot signals and then the reproduced pilot signals are amplified to a suitable level by the AGC amplifier 5 and supplied to the sample and hold circuit 6. The sample and hold circuit 6 samples the reproduced pilot signals with pilot signal frequencies f1 to f4 supplied from the clock frequency divider 17 and holds them. The reproduced pilot signals sampled with the pilot signal frequencies f1 to f4 are converted into digital signals by the AD converter 7 and then supplied to a 0.5fH-BPF60, a 1fH-BPF 8, a 3fH-BPF 9 and a DA converter 18. The 0.5fH-BPF 60 has the construction shown in FIG. 4 and is supplied with coefficient data $\alpha$, $\beta$ and $\gamma$ from the ROM 10.

An aliasing frequency of the 0.5fH component of the pilot signal f5 derived by the 0.5fH-BPF 60 is supplied to the peak detector 61. The peak detector 61 has the construction shown in FIG. 6 and operates similarly to detect the maximum value of the input signal at the period of the frequency divided signal supplied from the frequency divider and supply it to the comparator 62.

The comparator 62 compares it with a predetermined level and supplies a result to the latch circuit 63. The predetermined level may be any level by which a discrimination of the pilot signal f5 is possible. An output of the comparator 62 is a one bit signal indicating presence of the pilot signal f5 when it is "1" and absence when it is "0".

The latch circuit 63 operates to latch the output data of the comparator 62 by the latch clock LACK supplied from an input terminal 64 at six timings when the sampling frequency is set to the frequency of the pilot signal f2 and the magnetic head 2 scans the respective channels CH1 to CH6 shown in FIG. 7. An output of the latch circuit 63, that is, the discrimination output for each track of the Multi-Track PCM audio recording, is provided at an output terminal 65.

The operations of the 1fH-BPF 8 and the 3fH-BPF 9 to which the output of the AD converter 7 is supplied and the components subsequent thereto are the same as those described with respect to the embodiment in FIG. 1. Therefore, details thereof are omitted to avoid duplication of description.

As described above, according to the second embodiment, it is possible to set the sampling frequency in AD conversion to a low value, which is advantageous in all aspects including operation speed, power consumption and circuit construction, etc., of the AD converter. Further, since it is possible to convert the pilot signals reproduced from both adjacent tracks into the 1fH and the 3fH signals by the sampling which is indispensable in AD conversion, there is no need of separately providing a multiplier for frequency conversion and thus the size of the circuit construction can be minimized. In addition thereto, the peak detectors and the BPFs for deriving the 1fH and 3fH signals and the 0.5fH signal which affect the performance of the ATF tracking control system considerably can be realized with digital circuits so that it is possible to prevent the characteristics thereof from being degraded due to variations of constitutional parts thereof or their time-dependent changes.

Further, the discrimination circuit for discriminating by the pilot signal f5 between the usual video signal recording and the Multi-Track PCM audio recording may be realized substantially by using the circuits for the ATF tracking control as they are, and therefore there is substantially no increase in the circuit construction.

The detection using the pilot signal f5 is possible only when the sampling frequency is the frequency of the pilot signal f2. Therefore, when it is necessary to detect the recording mode of the tape immediately after the tape loading, that is, before the tape starts to be transported, it is enough to set the sampling frequency to the frequency of the pilot signal f2.

In the embodiments shown in FIGS. 1 and 9, the peak detectors and the digital BPFs for the 0.5fH, 1fH and 3fH signals are depicted as separate blocks, respectively. However, since signals to be processed thereby are digital signals, a basic construction can be provided as a single circuit block by processing the various signals in time division. Further, although in these embodiments the AGC amplifier 5 processes an analog signal, it is of course possible to digitalize it by increasing a 1uantizing preciseness of the AD converter 7 and arranging the AGC amplifier downstream of the AD converter 7. In such case, the DA converter 18 can be removed.

Figure 10:
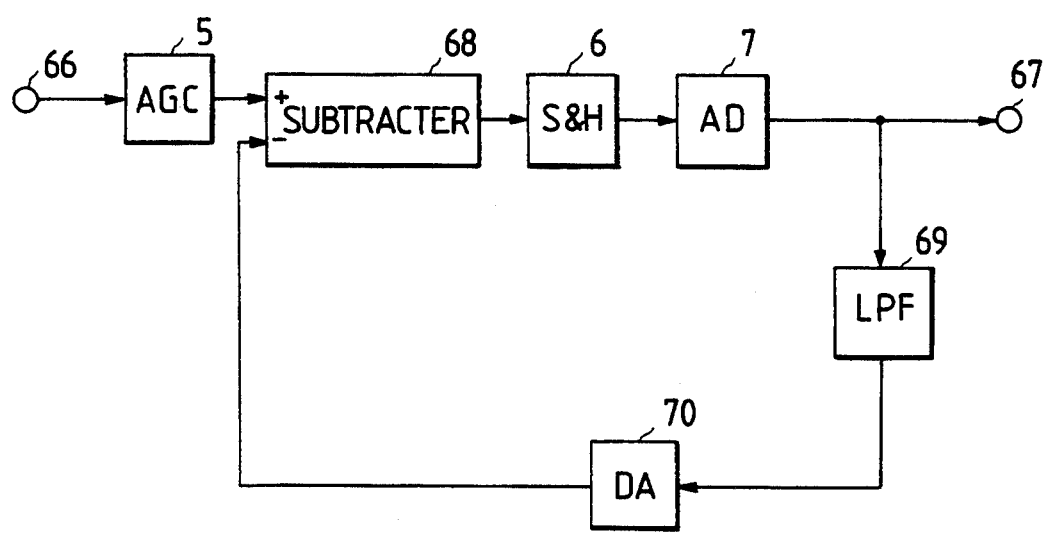
FIG. 10 is a block circuit diagram of a circuit for removing a scan track pilot signal.

Further, in the embodiment shown in FIG. 1, when the reproduced pilot signal is sampled at the pilot signal frequency of the main track, the reproduced pilot signal is not always in synchronism with the sampling signal. Therefore, an aliasing signal of the reproduced pilot signal from the main track which is very low in frequency and substantially larger in amplitude than the aliasing signals of the pilot signals reproduced from both adjacent tracks is usually produced by the sampling. With such an aliasing signal from the main track which is unnecessary information, it is necessary to increase the dynamic range of the AD converter 7, that is, the number of quantizing bits thereof. FIG. 10 shows a feedback circuit which solves the problem of the necessity of increasing the number of quantizing bits of the AD converter 7 by removing the pilot signal of the main track.

In FIG. 10, an input terminal 66 of an AGC amplifier 5 is connected to the output terminal of the LPF 4 in FIG. 1 and an output terminal 67 is connected to an input of the 1fH-BPF 8 in FIG. 1. The feedback circuit shown in FIG. 10 further includes a subtracter 68 arranged between the AGC amplifier 5 and the sample and hold circuit 6. The subtracter 68 has a plus input connected to an output of the AGC amplifier 5 and a minus input. The feedback circuit further includes a LPF 69 having an input connected to an output of the AD converter 7 and a DA converter 70 having an input connected to an output of the LPF 69 and an output connected to the minus input of the subtracter 68.

In operation, the reproduced pilot signal converted into digital signals by the AD converter 7 is passed through the LPF 69 to derive only the aliasing signal component of the main pilot signal reproduced from the main track and the main track aliasing signal component is D-A converted by the DA converter 70 and supplied to the minus input of the subtracter 68. The subtracter 68 subtracts the main track aliasing signal component of the main pilot signal from the reproduced pilot signal and provides at its output a difference therebetween. Therefore, the signal sampled and held by the sample and hold circuit 6 and supplied to the AD converter 7 contains only the aliasing signals of the pilot signals from both adjacent tracks, resulting in reduction of the number of quantizing bits of the AD converter 7.

Further, in the embodiment shown in FIG. 9, the sampling frequencies of the reproduced pilot signals are set to the pilot signal frequencies f1 to f4 and the aliasing signal frequency of the pilot signal f5 is very near the frequency 1fH as shown in Table 3. Therefore, it is necessary to make the cut-off characteristics of the 1fH-BPF relatively sharp. However, the sharpness of the cut-off characteristics of the 1fH-BPF can be reduced by setting the sampling frequency to twice each of the pilot signal frequencies f1 to f4 to restrict the aliasing signal component of the pilot signal f5 and then thinning digital data every two data to make the sampling frequency again equal to each of the pilot signals f1 to f4 to thereby obtain the aliasing signal component of the reproduced pilot signal.

Figure 11:
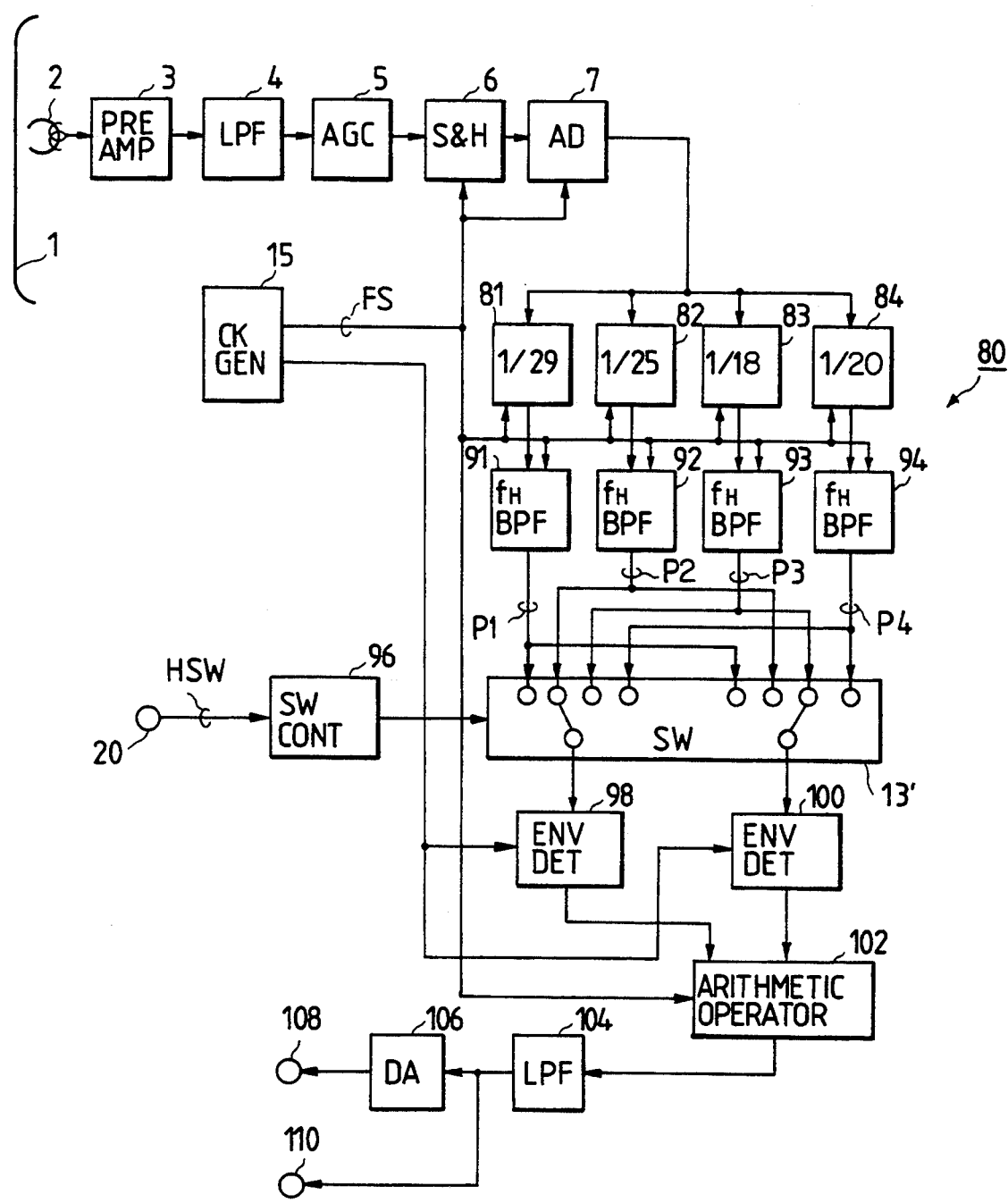
FIG. 11 is a block circuit diagram of a tracking device according to a third embodiment of the present invention.

FIG. 11 shows a third embodiment of the present invention which is suitable to perform the just described data thinning scheme.

In FIG. 11, a signal reproduced a magnetic head 2 from a magnetic tape 1 is amplified by a pre-amplifier 3, passed through a LPF 4 to remove unnecessary high frequency components, amplified again by an AGC amplifier 5, sampled by a sample and hold circuit 6 at a sampling frequency supplied from a clock generator 15 and A-D converted by an AD converter 7, as in the embodiments shown in FIGS. 1 and 9. The clock generator 15 oscillates at the sampling frequency which is any common multiple of the reproduced pilot signals f1 to f4 and, in this embodiment, it is set to 189 fH which is least common multiple of the reproduced pilot signals f1 to f4. The resultant digital signal from the AD converter 7 is supplied to a data thinning circuit 80.

The data thinning circuit 80 includes a a 1/29 frequency divider 81, a 1/25 frequency divider 82, a 1/20 frequency divider 83 and a 1/18 frequency divider 84, all of which are connected in parallel. In the data thinning circuit 80, the reproduced pilot data sampled at 189 fH is thinned such that the sampling frequency is converted into f1 ($\approx$6.5 fH), f2 ($\approx$7.5 fH), f3 ($\approx$0.5 fH) and f4 ($\approx$9.5 fH) which are the four-frequency pilot signal frequencies. The four-frequency pilot signals produced by the sampling frequency conversion produce the aliasing signals shown in Table 1. The reproduced pilot signals whose sampling frequencies are converted by the data thinning circuit 80 are supplied to 1fH-BPFs 91 to 94, respectively, and 1fH components thereof are derived and supplied to a switch 13' which is switched sequentially under control of a switch control signal supplied from a switch control circuit 96.

From Table 1, a frequency output P1 of the 1fH-BPF 91 becomes the reproduced pilot signal f1, a frequency, output P2 of the 1fH-BPF 92 becomes the reproduced pilot signal f2, a frequency output P3 of the 1fH-BPF 93 becomes the reproduced pilot signal f3 and a frequency output P4 of the 1fH-BPF 94 becomes the reproduced pilot signal f4. The four-frequency reproduced pilot signals derived by the 1fH-BPFs 91 to 94 and supplied to the switch 13' are supplied to envelope detectors 98 and 100 sequentially according to the switch control signal supplied from the switch control circuit 96. The switch control circuit 96 operates to switch the switch 13' at the scan period of the magnetic head 2 according to a head switching signal HSW supplied through an input terminal 20.

The switching control of the switch 13' will be described in more detail. As described with respect to the prior art shown in FIG. 23, levels of the pilot signals reproduced from adjacent tracks are to be detected. For this detection, in the third embodiment, the aliasing signals of the four-frequency reproduced pilot signals derived from the 1fH-BPFs 91 to 94 are sequentially switched and supplied to the envelope detectors 98 and 100. For example, when the magnetic head 2 is scanning the track on which the pilot signal f2 is recorded, the envelope detector 98 is supplied with the signal P1, that is, the pilot signal f1 of the preceding track and the envelope detector 100 is supplied with the signal P3 which is the pilot signal f3 of the succeeding track. With the shifting of scanning of the magnetic head 2 from the track f1 through the track f2 and then the track f3 to the track f4, the envelope detector 98 is supplied with the signals P1, P2, P3, P4 and P1 sequentially, and the envelope detector 100 is supplied with the signals P3, P4, P1, P2 and P3 sequentially. Therefore, in this case, the envelope detector 98 is always supplied with a pilot signal of a preceding track while the envelope detector 100 is always supplied with a pilot signal of a succeeding track.

The envelope detectors 98 and 100 detect envelopes of the pilot signals of the preceding tracks and those of the succeeding tracks and supply them to an arithmetic operation circuit 102. The arithmetic operation circuit 102 obtains a difference between the envelope level of the pilot signals of the preceding tracks and that of the succeeding tracks and supplies the difference as a difference signal to a LPF 104. The difference signal supplied to the LPF 104 is the tracking error signal. The LPF 104 is to remove hitch frequency components of the tracking error signal, which are unnecessary for tracking control.

The tracking error thus produced is D-A converted by a DA converter 106. The tracking error signal at an output terminal 108 is added by the adder 27 (FIG. 23) to a speed error signal supplied from she capstan speed control circuit 26 (FIG. 23) and supplied to the motor driver 24 (FIG. 23) so rotate the capstan 22 (FIG. 23) at a constant speed in a predetermined phase. In this embodiment, a direct output terminal 110 of the LPF 104 is provided in order to accommodate a case where the adder 27 and the capstan control circuit 26 are constituted with microcomputer and the summation is performed digitally.

Each of the 1fH-BPFs 91 to 94 is substantially the same as shown in FIGS. 3 and 4. Each of the envelope detectors 98 and 100 is also substantially the same as the peak detector shown in FIG. 6, with the exception that an absolute value conversion circuit is arranged between the input terminal 54 and the junction of the comparator 57 and the latch 58.

Figure 12:
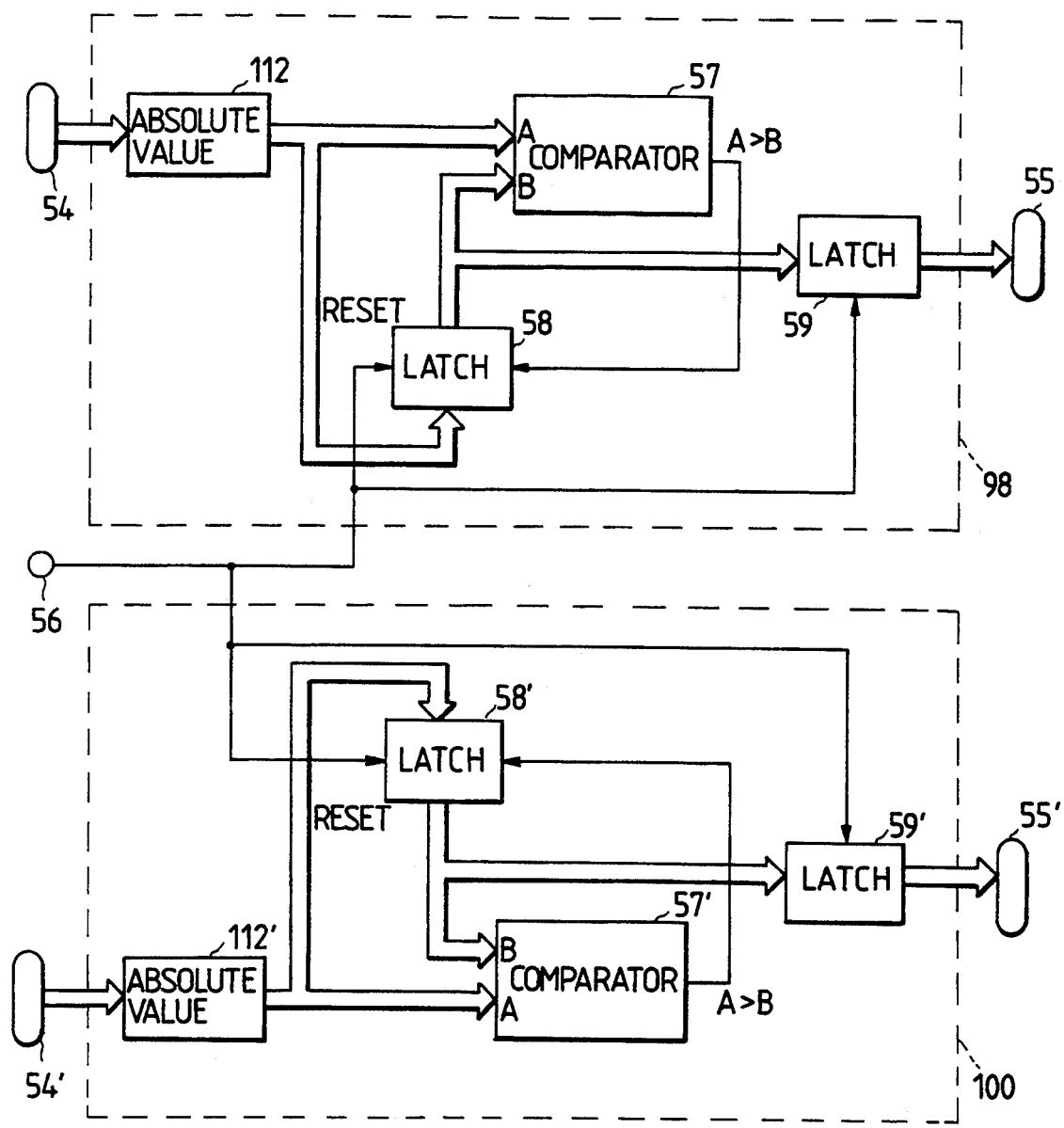
FIG. 12 is a block circuit diagram of a digital envelope detector of the tracking device in FIG. 11.

FIG. 12 shows a construction of the envelope detectors 98 and 100 which is constituted by connecting two of the peak detectors shown in FIG. 6 modified as discussed above in parallel with the reset input 56 being common.

In FIG. 12, the 1fH signal from the input terminal 54 54') is full-wave rectified by the absolute value converter 112 112') and supplied to the comparator 57 (57') and the latch 58 (58'), so that the latch 58 (58') latches the maximum data the 1fH signal at the period of a clock frequency of about 1fH/2 generated by the clock generator 15 in FIG. 11. Since the sampling frequency (output data rate) of the output signal data of the envelope detector 98 (100) is determined by the latch frequency of the latch 59 (59'), it is possible to make the sampling frequency of the envelope detection signal, which is to be supplied to the arithmetic operation circuit 102, equal to the sampling frequency of the input 1fH signal even if they are different so that the subtracting operation can be done easily.

Figure 13:
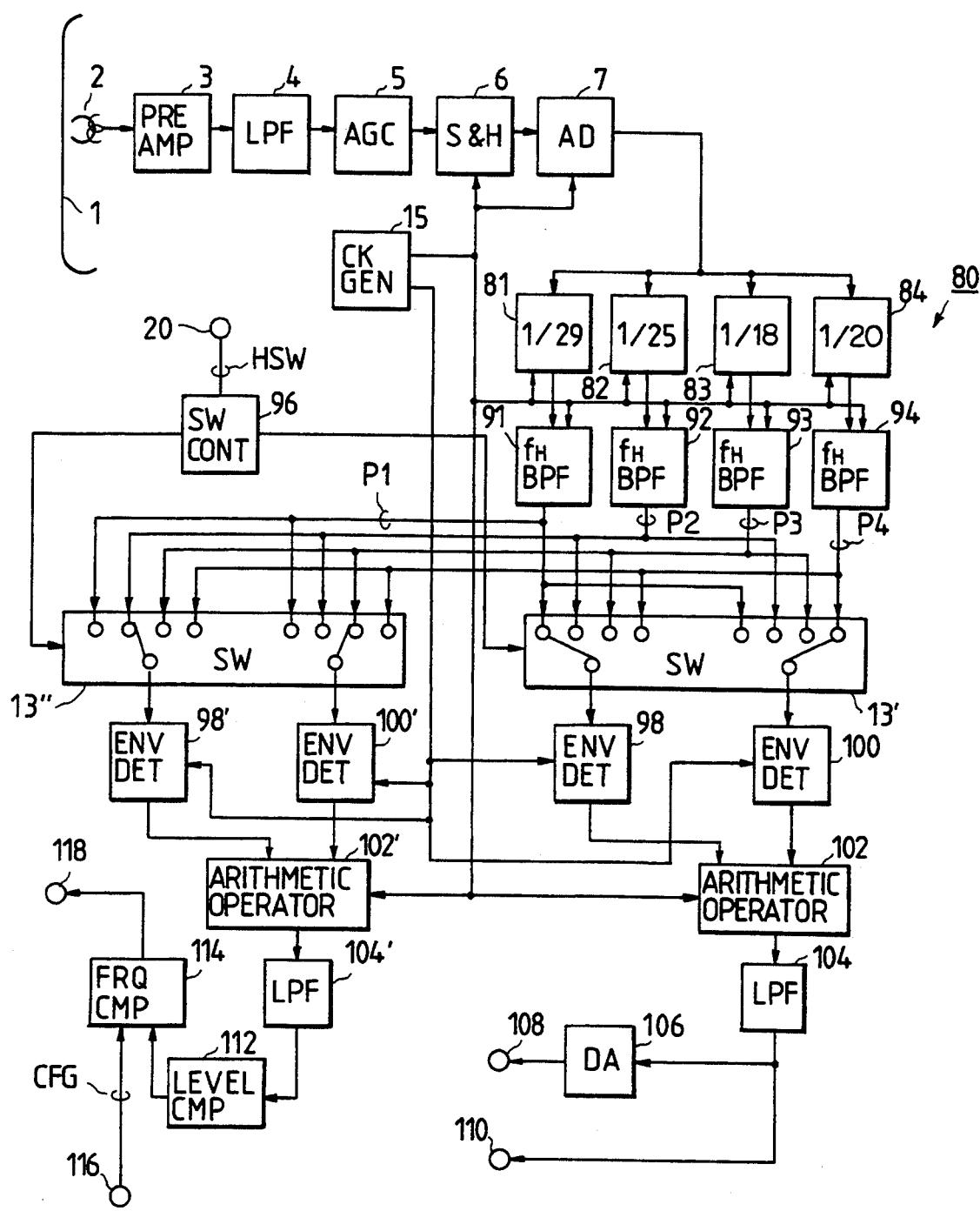
FIG. 13 is a block circuit diagram of a tracking device according to a fourth embodiment of the present invention.

FIG. 13 shows a fourth embodiment of the present invention applied to a tracking device of the ATF system in a magnetic recording and reproducing apparatus operable in an extra long time play (LP) mode in which a tape speed in recording is one half of the usual speed.

In the magnetic recording and reproducing apparatus operable in the LP mode, it is necessary, in reproduction, to discriminate the LP mode from a standard play (SP) mode, or vice versa, while performing the tracking control, as mentioned previously. In order to realize this, a switch 13", envelope detectors 98' and 100', an arithmetic operation circuit 102' and a LPF 104' are provided in parallel to the switch 13', the envelope detectors 98 and 100, the arithmetic operation circuit 102 and the LPF La in the third embodiment in FIG. 11, respectively. The constructions of the added components 98' 100' 102' and 104' and their interconnections are identical to those shown in FIG. 11, respectively. Further, in FIG. 13, a level comparator 112 having an input connected to an output of the LPF 104' and a frequency comparator 114 having an input connected to an output of the level comparator 112 are provided.

Before describing the SP/LP mode discriminating operation to be performed by those components added to the construction shown in FIG. 11, the principle of the SP/LP mode discrimination will be described with reference to FIGS. 14 and In discriminating the SP/LP mode, pilot signals of a main track under scanning and of a track next to a track adjacent to the main track (referred to as "next adjacent track" hereinafter) are used contrary to the tracking control in which the pilot signals of the both tracks adjacent to the main track are used. FIG. 14 shows a pattern of tracks on which the four-frequency pilot signals are recorded sequentially. In FIG. 14, the abscissa indicates a longitudinal direction of the magnetic tape and the ordinate indicates a scan period of the magnetic head. Numerals 1 to 4 in the pattern indicate the pilot signals f1 to f4, respectively. Assuming that a recording speed is the same as a reproducing speed and the magnetic head scans the magnetic tape from a point A to a point B, a difference in level between the pilot signal reproduced from the main track which is shifted sequentially f1, through f3 and f4 to f1 and the pilot signal reproduced from the next adjacent track which is correspondingly shifted from f3 through f4, f1 and f2 to f3 sequentially is constant.

On the other hand, when the tape seed in reproduction is three times that in recording, the magnetic head scans the tape from the point A to a point C. In this case, the level of the pilot signal reproduced from the main track (hatched by lateral lines) and that reproduced from the next adjacent track (hatched by vertical lines are as shown in FIGS. 14-(1) and 14-(2), respectively, and a comparison signal is as shown in FIG. 14-(3).

Figure 15:
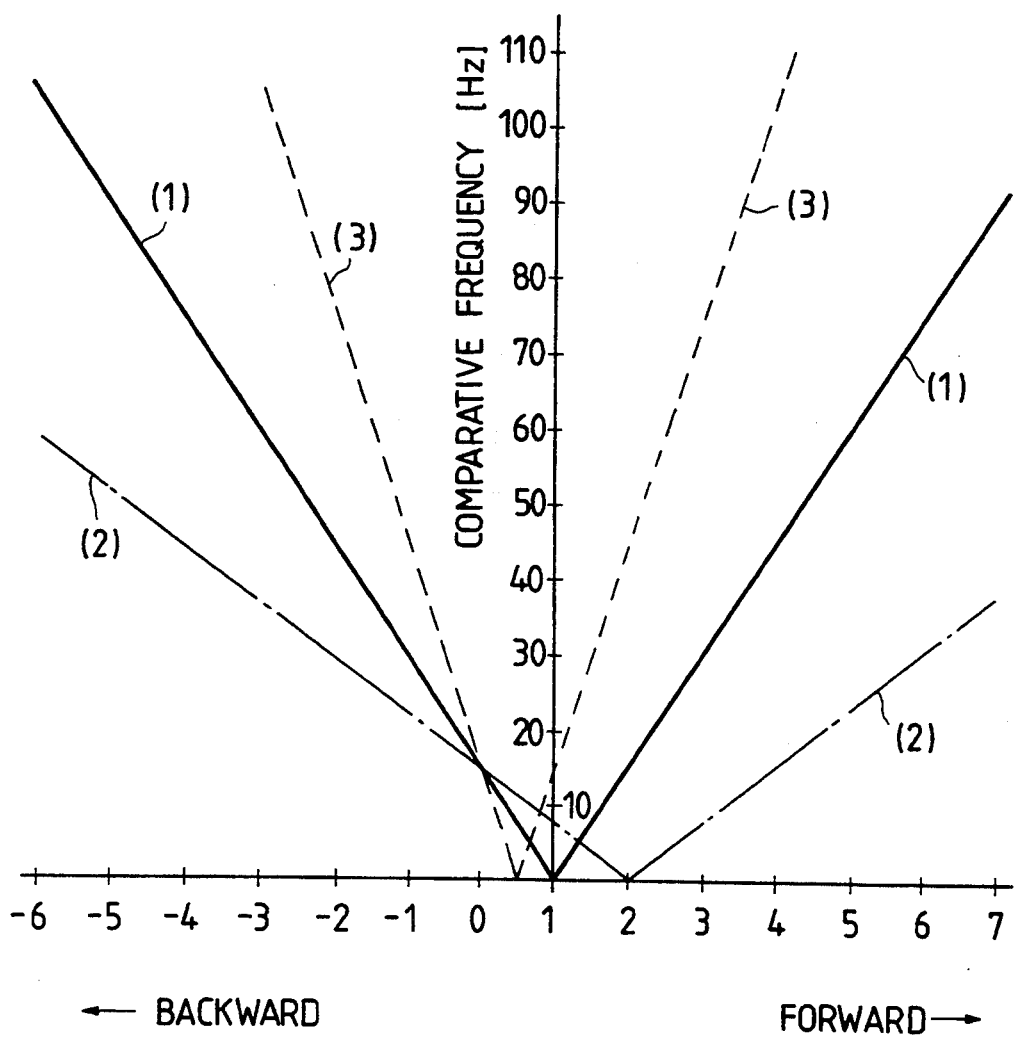
FIG. 15 is a graph showing a relation of reproduction tape speed and comparison signal frequency.

In FIG. 15, the reproducing speed is indicated on the abscissa and the ordinate indicates the frequency of the comparison signal. Numerals on the abscissa in FIG. 15 indicate the ratio of the reproducing speed to the recording speed. Characteristic lines (1) in FIG. 15 show a case where modes of reproducing and recording are the same, lines (2) show a case where the recording is performed in SP mode while the reproducing is performed in LP mode and lines (3) show a case where the recording is performed in LP mode while reproducing is performed in SP mode. By determining the reproducing tape speed from the characteristic lines in FIG. 15 and detecting the frequency of the comparison signal in FIG. 14-(3), it is possible to discriminate between SP mode and LP mode in recording, except at cross points of these lines. Such exception may be not important since such cross points are concentrated within a range from 0 to 2 on the abscissa and the tape speed in reproducing is usually set to an integer multiple of the recording speed. The tracking device shown in FIG. 13 is constructed according to the principle mentioned above.

Referring to FIG. 13, the discrimination between SP mode and LP mode is performed by blocks 13' 98' 100' 102' and 104', which are identical to those blocks 13' 98 100 102 and 104, respectively, and arranged in parallel thereto, and blocks 112 and 114. The operation of the circuit including the blocks 1 to 7 and 80 to 94 in reproduction is similar to that described with respect to FIG. 11. Therefore, the output pa of the 1fH-BPF 91 becomes the reproduced pilot signal f1, the output P2 of the 1fH-BPF 92 is the reproduced pilot signal f2, the output P3 of the 1fH-BPF 93 is the reproduced pilot signal f3 and the output P4 of the 1fH-BPF 94 is the reproduced pilot signal f4. The switch 13" to which the outputs P1, P2, P3 and P4 are supplied is sequentially switched by the switch control signal synchronized with the head switching signal HSW supplied from the switch control circuit 96. Thus, the outputs P1 to P4 are supplied to the envelope detector 98' and 100' sequentially.

In this case, contrary to she switch 13' of the tracking control system which selects pilot signals from the both adjacent tracks, the switch 13" selects the pilot signals from the main track and the next adjacent track. In detail, assuming that the envelope detector 98 receives the pilot signal P1, P2, P3, P4 and P1 sequentially and the envelope detector 100 receives the pilot signal P3, P4, P1, P2 and P3 sequentially, the envelope detector 98' receives the pilot signal P2, P3, P4 and P2 sequentially and the envelope detector 100' receives the pilot signal P4, P1, P2, P3 and P4 sequentially. Therefore, the envelope detectors 98' and 100' detect envelopes of the pilot signals from the main track and the next adjacent track which are supplied to the arithmetic operation device 102'. The arithmetic operation device 102' provides a difference in level between these envelopes and send the difference as a difference signal to the level comparator 112 after high frequency components thereof are removed by the LPF 104'. The level comparator 112 compares this envelope level difference signal to a predetermined level and a comparison output (logic level signal is supplied to the frequency comparator 114 which is supplied with a CFG signal (an PG signal of the capstan which has a frequency proportional to the tape speed.) Supplied from an input terminal 116. The discrimination between SP and LP modes is performed by using a frequency difference between the comparison output and the CFG signal detected by the frequency comparator 114 and the reproduction speed data shown in FIG. 15 and a result is outputted to an output terminal.

As described, according to this embodiment, in order to process the four-frequency reproduced pilot signals digitally, the four-frequency reproduced pilot signals can be converted into 1fH frequency signals by converting the sampling frequency during the AD conversion thereof into a common multiple of these pilot signals and thinning the sampling data. Therefore, there is no need of separately providing a frequency converting multiplier, resulting in a compact circuit construction. Particularly, there is no need of adding any frequency converter and/or band-pass filters for the pilot signals even when the tracking control as well as the SP/LP discrimination function are to be realized.

In addition, since it is possible to realize the BPFs and the envelope detectors, etc., for deriving the lfH components which considerably affect the ATF tracking control system and the SP/LP discriminating function by means of digital circuits, variations of respective constitutional parts and time-dependent degradation of their characteristics which are serious problems in analog signal processing can be eliminated.

In the second and third embodiments described herein before, the LPF 4 provided upstream of the sample and hold circuit 6 should have a characteristic such that high frequency components of the reproduced signal are removed sufficiently to prevent other components of the reproduced signal than the pilot signals thereof from being aliases at around the lfH frequency. For example, in the magnetic recording and reproducing apparatus called "8 nun Video", the frequency allocation of the recording and reproducing signal is as shown in FIG. 16 and therefore the LPF must have a sharp cut-off characteristic as shown by dashed line (2) in FIG. 16.

Figure 17:
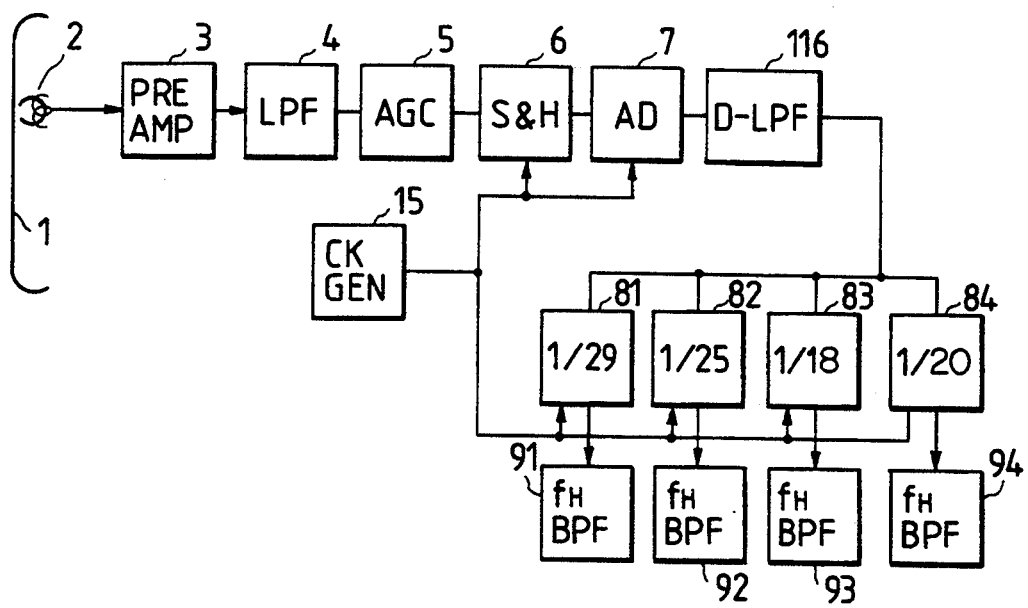
FIG. 17 is a block diagram of a tracking device according to a fifth embodiment of the present invention.

In order to realize such a sharp cut-off characteristic of the LPF 4, it is possible to provide a digital LPF (D-LPF) 116 upstream of the circuitry for thinning the sampling data to thereby remove the undesired high frequency components (e.g., 200 kHz to 1.5 MHz components) as shown in FIG. 17.

Figure 16:
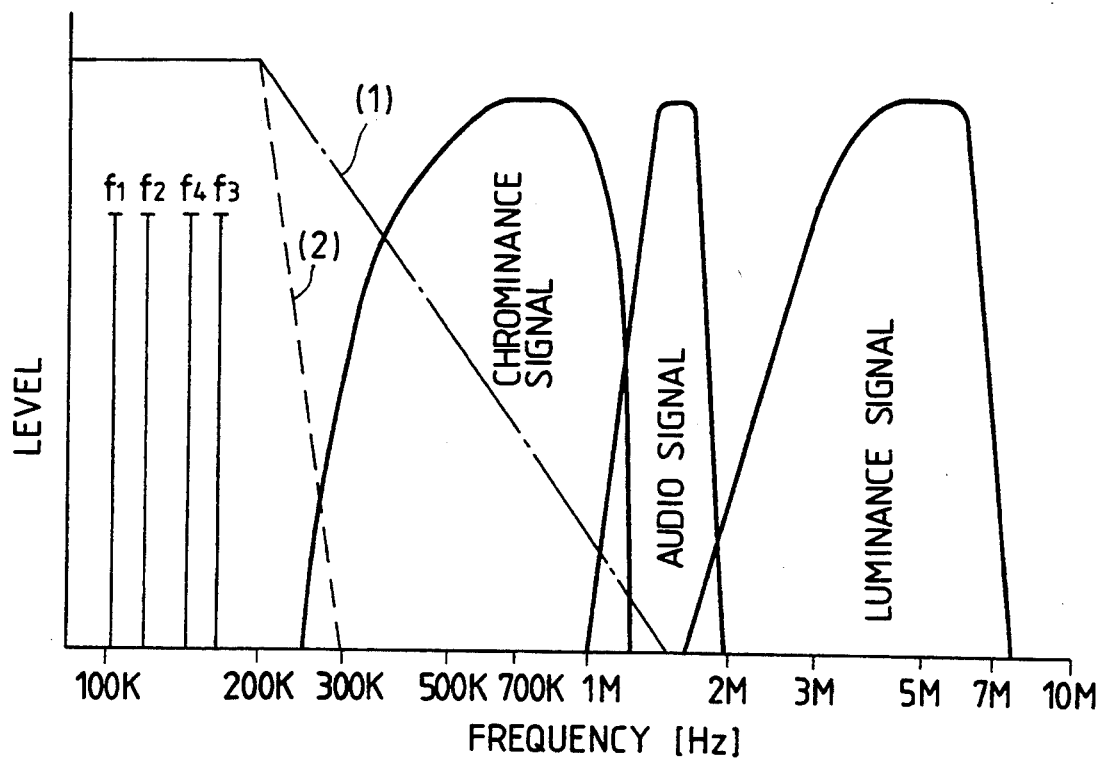
FIG. 16 is a graph showing a frequency allocation of a recording/reproducing signal.

With such a D-LPF 116, the sharpness of the cut-off characteristic of the LPF 4 may be as low as that shown by dot-dash line (1) in FIG. 16 and it is also possible to reduce the number of quantizing bits of the AD converter. That is, since the quantizing noise AS distributed substantially uniformly in the effective band, it is possible no reduce the quantizing noise by limiting the sand after sampling so that the number of quantizing bits is increased equivalently. Therefore, by sampling the pilot signal whose frequency is less than 200 kHz at 3 MHz ($\approx$189 fH) and limiting frequency to a band up to 200 kHz by means of the digital LPF, the number of quantizing bits is increased by 2, resulting in reduction of quantizing bits of the AD converter.

Figure 18:
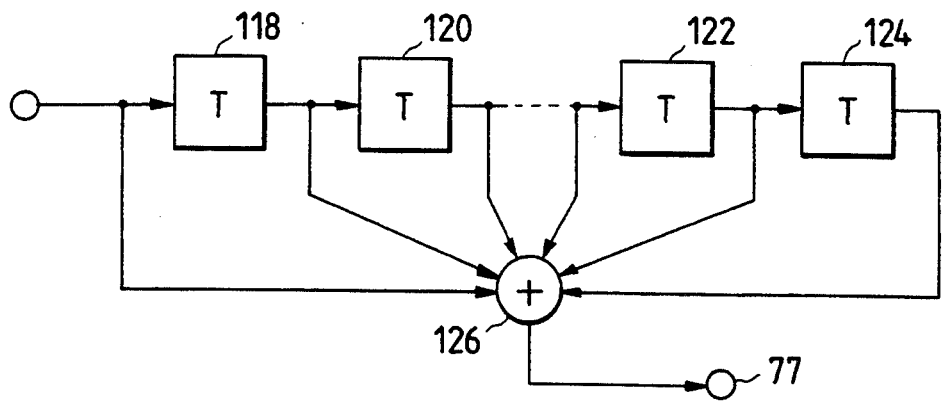
FIG. 18 is a block circuit diagram of a digital LPF of the device in FIG. 17.
Figure 20:
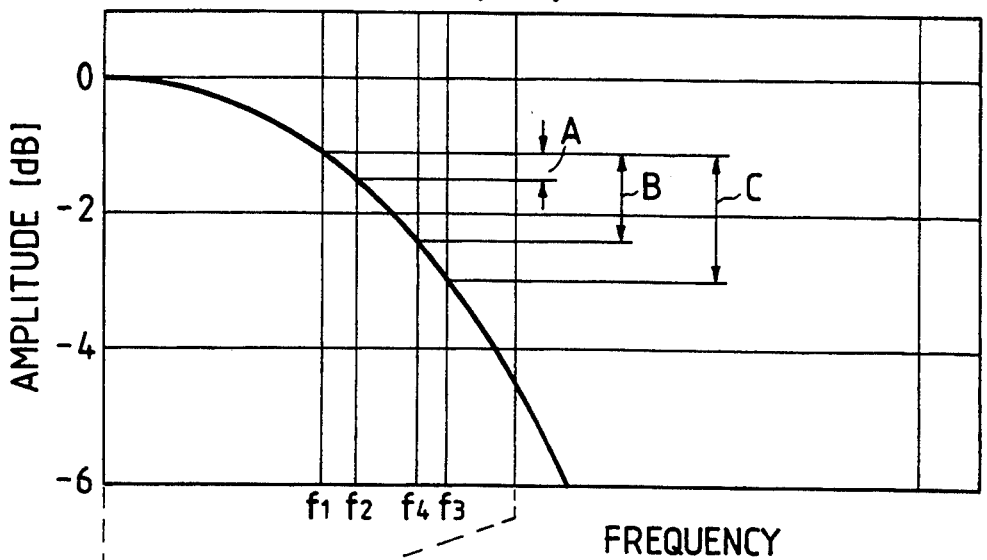
FIG. 20 is a Graph showing a characteristic of the digital LPF in FIG. 18.
Figure 20:
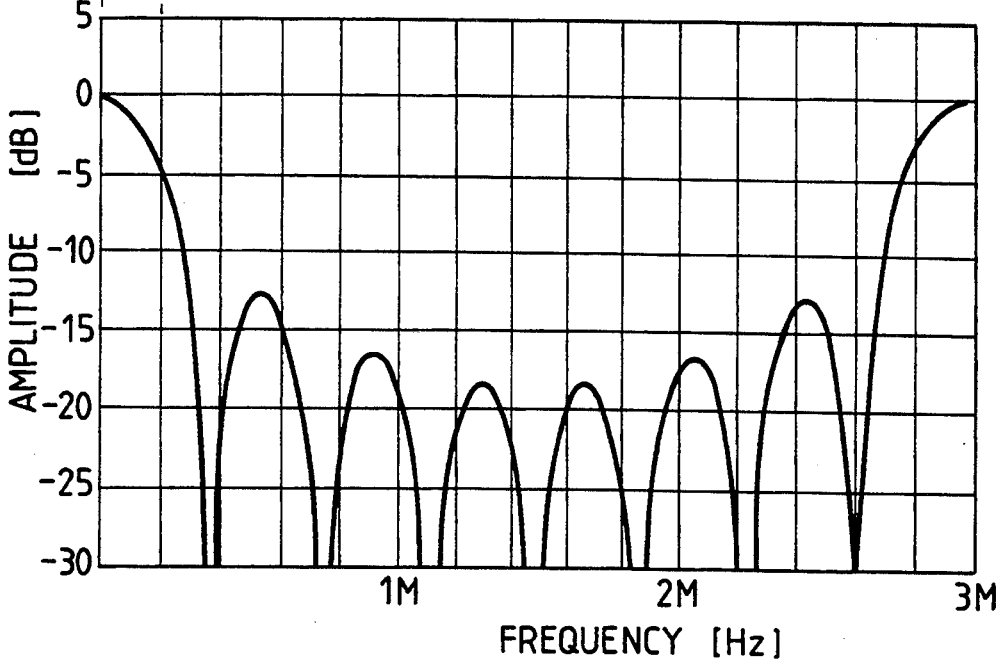

When, in order to make the D-LPF 116 compact, the D-LPF 116 is constituted as a transversal LPF such as shown in FIG. 18 the characteristic thereof exhibits a level variation within its pass-band as shown in FIG. 20. In FIG. 18, the transversal LPF is composed of delay circuits 118, 120 ...., 122 and 124 and an adder 126. The characteristic shown in FIG. 20 is one obtained when the number of taps of the LPF shown in FIG. 18 is 8 and level differences of the pilot signal frequencies f2, f4 and f3 with respect to f1 are shown by A, B and C, respectively.

Such level differences of the pilot signals provide a disturbance of 15 Hz which is one fourth of the head scanning frequency in the tracking control. The characteristic of the D-LPF 116 in such a case includes substantially no variation since it is determined only by delay times of the delay circuits. Therefore, it is possible to compensate for the level differences of the pilot signal f1 to the pilot signals f2, f4 and f3 in output stages 130, 132 and 134 which are coefficient circuits of the lfH-BPFs 92 to 94, respectively, as shown in FIG. 19.

Figure 19:
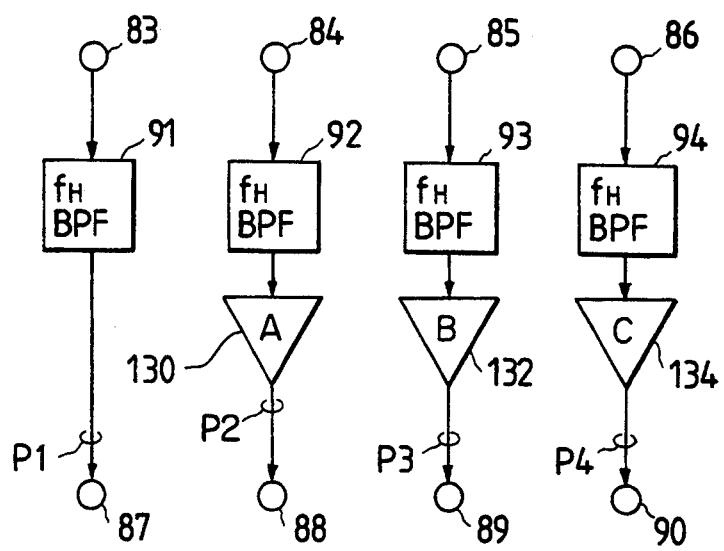
FIG. 19 is a block circuit diagram of a pilot signal level compensator of the device in FIG. 17.

Since the lfH-BPFs 91, 92, 93 and 94 shown in FIG. 3 each include in their output stages the coefficient circuit 45, the need of adding such coefficient circuits 130, 132 and 134 as shown in FIG. 19 separately can be avoided by multiplying coefficients corresponding to the level differences A, B and C with the coefficient $\alpha$ of the coefficient circuit 45.

Although in the second and third embodiments described. herein before, the reproduced pilot signals are detected by converting them into lfH signals, it is possible to detect them by converting them into a lfH signal and a 3fH signal as in the first embodiment shown in FIG. 1. In order to do so, the thinning circuit and the associated BPFs in FIG. 11 or 13 may be modified as shown in FIG. 21 or 22, for example.

Figure 21:
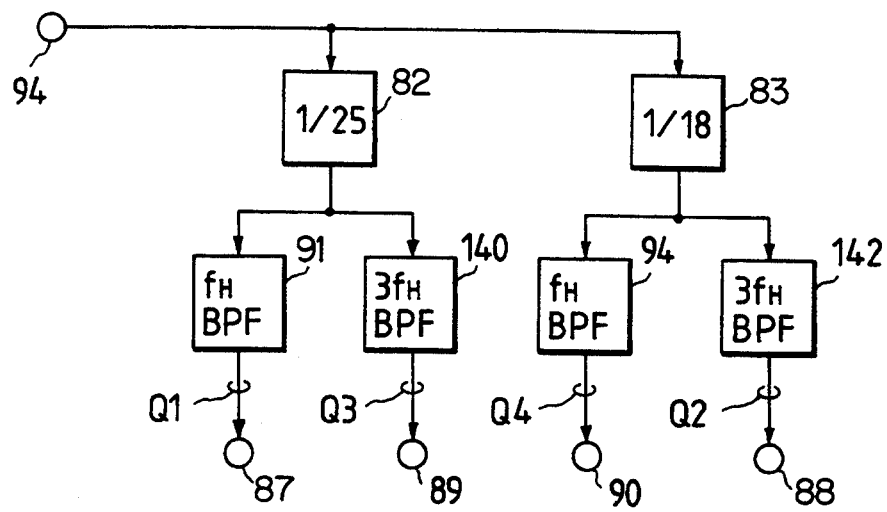
FIG. 21 is a block circuit diagram showing another example of a reproduced pilot signal deriving system.
Figure 22:
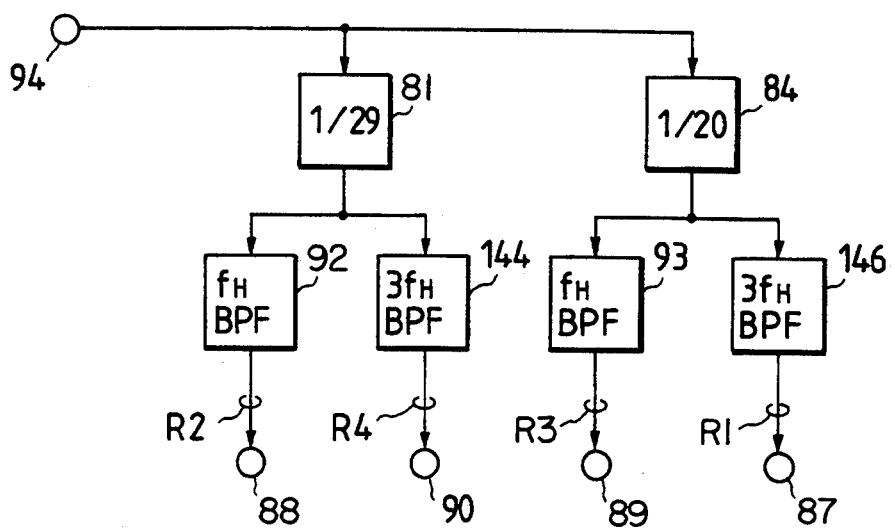
FIG. 22 is a block circuit diagram showing a further example of a reproduced pilot signal deriving system.

In FIG. 21, the sampling data thinning circuit is composed of the 1/25 frequency divider 82 and the 1/18 frequency divider 83. In this case, since the frequency divider 82 converts the sampling frequency into the frequency f2, the aliasing frequencies of the reproduced pilot signals f1 and f3 become lfH and 3fH, respectively. On the other hand, since the frequency divider 83 converts the sampling frequency into the frequency f3, the aliasing frequencies of the reproduced pilot signals f4 and f2 become lfH and 3fH, respectively. Therefore, in FIG. 21, the outputs Q1, Q3, Q4 and Q2 of the lfH-BPF 91, a 3fH-BPF 140, the lfH-BPF 94 and a 3fH-BPF 142 become aliasing frequencies of the pilot signals f1, f3, f4 and f2 respectively In the case shown in FIG. 22 in which the sampling data thinning circuit is composed of the 1/29 frequency divider 81 and the 1/20 frequency divider 84, since the frequency divider 81 converts the sampling frequency into the frequency f1, the aliasing frequencies of -he reproduced pilot signals f2 and f4 become lfH and 3fH, respectively. On the other hand, since the frequency divider 84 converts the sampling frequency into the frequency f4, the aliasing frequencies of the reproduced pilot signals f3 and f1 become lfH and 2fH, respectively. Therefore, in FIG. 22, the outputs R2, R4, R3 and R1 of the lfH-BPF 92, a 3f-HPF 144, the lfH-BPF 93, and a 2fH-BPF 146 become aliasing frequencies of the pilot signals f2, f4, f3 and f1, respectively.

In the reproduced pilot, signal frequency converters shown in FIGS. 1 and 2 the number of the sampling data thinning circuits can be reduced to 2.

As described herein before, according to the present invention, a high performance tracking device which is capable of being integrated at a high density and is free from variations of constitutional parts and their time-dependent degradation is realized by digitizing the ATF tracking control system with a minimum number of circuit components.

Further, the present invention can be applied to a magnetic recording and reproducing apparatus having an extra long continuous recording mode which requires a discrimination between such mode and the usual recording mode, without providing separate pilot signal frequency conversion circuits and associated band-pass filters.

Although the present invention has been described with reference to the specific embodiments, this description is not meant to be construed in a limiting sense. Various modification: of the disclosed embodiments, as well as other embodiments of the present invention, will become apparent to persons skilled in the art upon reference to the description of the present invention. It is therefore contemplated that the appended claims will cover any modifications or embodiments as fall within the true scope of the present invention.

What is claimed is:

1. A tracking device for a magnetic recording and reproducing apparatus in which, in recording, a plurality of pilot signals having mutually different frequencies are recorded sequentially on tracks of a magnetic recording medium formed by helical scan of the magnetic recording medium by means of a magnetic head such that a difference between the frequency of each of the pilot signals recorded on the magnetic recording medium and the frequency of an adjacent one of the pilot signals recorded on the magnetic recording medium is less than twice the frequency of the adjacent pilot signal and, in reproducing, tracking control is performed according to a level difference of the pilot signals reproduced from one of the tracks which is currently being scanned and both tracks adjacent to said one track, said tracking device comprising:

sampling means for sampling reproduced pilot signals with frequencies of at least two of the pilot signals;

digital filter means for deriving an aliasing signal component of each of the reproduced and sampled pilot signals obtained by said sampling means; and feedback means for feeding back a tracking error signal corresponding to a signal level of the aliasing signal component derived by said digital filter means to a magnetic tape drive means of said recording and reproducing apparatus.

2. A tracking device for use in a magnetic recording and reproducing apparatus including a magnetic recording medium having tracks formed by helical scan on which a plurality of pilot signals having mutually different frequencies are recorded sequentially and circulatingly such that a difference between the frequency of each of the pilot signals recorded on the magnetic recording medium and the frequency of an adjacent one of the pilot signals recorded on the magnetic recording medium is less than twice the frequency of the adjacent pilot signal, for performing tracking control according to a level difference between the pilot signals reproduced from both adjacent tracks to a track under scanning by a magnetic head, said tracking device comprising:

sampling means for sampling reproduced pilot signals with a frequency equal to a common multiple of frequencies of the pilot signals;

thinning means for selectively removing data from said sampled reproduced pilot signals at a predetermined rate to produce thinned sampled reproduced pilot signals;

digital filter means for deriving an aliasing signal component of said thinned sampled reproduced pilot signals produced by said thinning means; and feedback means for feeding back a tracking error signal corresponding to a level of said aliasing signal component derived by said digital filter means.

3. A tracking device for use in a magnetic recording and reproducing apparatus including a magnetic recording medium having tracks formed by helical scan on which a plurality of pilot signals having mutually different frequencies are recorded together with information signals sequentially and circulatingly such that a difference between the frequency of each of the pilot signals recorded on the magnetic recording medium and the frequency of an adjacent one of the pilot signals recorded on the magnetic recording medium is less than twice the frequency of the adjacent pilot signal, for performing, in reproduction, tracking control according to the pilot signals reproduced, said tracking device comprising:

analog to digital conversion means for converting the reproduced pilot signals into digital reproduced pilot signals by sampling the reproduced pilot signals at a sampling frequency lower than twice the frequencies of the reproduced pilot signals;

filter means for deriving an aliasing signal component of the digital reproduced pilot signals; and means for generating a tracking control signal from the aliasing signal component of the digital reproduced pilot signals derived by said filter means to control a tracking control actuator of the recording and reproducing apparatus.

4. A tracking device for a magnetic recording and reproducing apparatus in which, in recording, a plurality of frequency pilot signals having frequencies mutually different by an amount smaller than twice a frequency of an adjacent pilot signal are recorded sequentially on tracks of a magnetic recording medium formed by helical scan of the magnetic recording medium by means of a magnetic head and, in reproducing, a tracking control is performed according to level difference of the pilot signals reproduced from one of the tracks which is currently being scanned and both tracks adjacent to said one track, said tracking device comprising:

means for sampling reproduced pilot signals with one of frequencies of the frequency pilot signals;

digital filter means for deriving an aliasing signal component of each of the reproduced and sampled frequency pilot signals obtained by said sampling means; and means for feeding back a tracking error signal corresponding to a signal level of the aliasing signal component derived by said digital filter means to a magnetic tape drive means of said recording and reproducing apparatus.

5. The tracking device claimed in claim 4, wherein said sampling means comprises:

low-pass filter means for restricting undesired high frequency component of the reproduced signal to derive the pilot signals therefrom; and analog to digital converter means for converting each said sampled reproduced pilot signal into a digital signal at a predetermined pilot signal period.

6. The tracking device claimed in claim 5, wherein said digital filter means comprises a single digital filter for deriving aliasing signal components of a first predetermined one of the plurality of said reproduced pilot signals from an output of said analog to digital converter means.

7. The tracking device claimed in claim 5, wherein said digital filter means comprises:

a first and a second digital filters for deriving aliasing signal components of a first end a second predetermined pilot signals of said reproduced pilot signals from an output of said analog to digital converter means.

8. The tracking device claimed in claim 7, wherein each said first and second digital filters comprises a band pass filter of quadratic infinite impulse response type.

9. The tracking device claimed in any of claims 4 to 8, wherein said feedback means comprises:

a first and a second level detector means connected to said first and said second digital filters, respectively, for detecting levels of said aliasing signals derived by said digital filters; and arithmetic operation means for providing a difference between outputs of said first and second detector means to obtain a tracking error signal to be fed back to a tape drive means of said recording and reproducing apparatus.

10. The tracking device claimed in any of claims 4 to 8, wherein said digital filter means comprises a single digital filter and said feedback means comprises a single level detector means connected to said single digital filter, for detecting a level of said aliasing signal derived by said digital filter means, said single digital filter and said single level detector being operable in time division.

11. The tracking device claimed in claim 10, wherein said magnetic recording and reproducing apparatus is operable in a first operation mode in which each helical track is divided longitudinally into two sections and a video signal and a time axis compressed PCM audio signal are recorded in one of said two section and in the other section, respectively, and a second operation mode in which said track section for said video signal is subdivided into a plurality of subsections and time axis compressed PCM audio signal is recorded in some of said subsections, in said first operation mode of which the plurality of said frequency pilot signals are recorded on tracks formed by helical scan sequentially circulatingly and in said second operation mode of which another pilot signal is recorded in addition to the plurality of said frequency pilot signals, said tracking device performing a tracking control according to level differences between the plurality of said pilot signals reproduced from said both adjacent tracks; and said tracking device further comprising means for discriminating between said first operation mode and said second operation mode.

12. The tracking device claimed in claim 11, wherein said discriminating means comprises:

a third digital filter for an aliasing signal component of said another reproduced pilot signal from an output of said analog to digital converter means;

third level detector means for detecting a level of said aliasing signal derived by said third digital filter; and a comparator for comparing said output of said third detector means to obtain a discrimination signal for discriminating between said first and second operation modes.

13. The tracking device claimed in claim 12, wherein said third level detector means comprises a single third level detector, said third digital filter and said third level detector being operable in time division.

14. The tracking device claimed in claim 12, wherein said third digital filter is a 0.5fH band pass filter, where 1fH is a horizontal synchronizing signal frequency of video signal.

15. A tracking device for use in a magnetic recording and reproducing apparatus including a magnetic recording medium having tracks formed by helical scan and recorded with a plurality of frequency pilot signals having frequencies mutually different by an amount smaller than twice a frequency of an adjacent pilot signal sequentially and circulatingly, for performing a tracking control according to a level difference between the plurality of said pilot signals reproduced from both adjacent tracks to a track under scanning by a magnetic head, said tracking device comprising:

sampling means for sampling the plurality of said reproduced pilot signals with a frequency equal to a common multiple of frequencies of the plurality of said pilot signals;

thinning means for thinning the plurality of said sampled pilot signals at rates corresponding to the respective frequencies of the plurality of said pilot signals;

digital filter means for deriving aliasing signals of said thinned pilot signals from said thinning means; and means for feeding back a tracking error signal corresponding to a level of said aliasing signal derived by said digital filter means.

16. The tracking device claimed in claim 15, wherein said sampling means comprises:

low-pass filter means for restricting at least undesired high frequency component of the reproduced signal to derive the reproduced pilot signals therefrom; and analog to digital converter means for converting said reproduced pilot signals from said low-pass filter into digital signals at a sampling frequency equal to a common multiple of frequencies of the plurality of said frequency pilot signals.

17. The tracking device claimed in claim 15, wherein said thinning means converts an output of said analog to digital converter means into a sampling frequency not more than twice a predetermined one of the plurality of said pilot signals.

18. The tracking device claimed in claim 15, 16 or 17, wherein said feedback means comprises level detector means for detecting the aliasing signal derived by said digital filter and arithmetic operation means for producing a tracking error signal according to an output of said level detector means, an output of said operation means being fed back to a tape drive means of said recording and reproducing apparatus.

19. The tracking device claimed in claim 18, further comprising means for detecting a frequency of level variation of said predetermined reproduced pilot signal reproduced by said magnetic head and supplied from said level detector means and wherein a tape speed in recording is determined by said level variation frequency.

20. The tracking device claimed in claim 15, wherein the plurality of said pilot signals comprise four-frequency pilot signals having frequencies f1, f2, f3 and f4 corresponding to 189fH/29, 189fH/25, 189fH/18 and 189fH/20, respectively, and said sampling frequencies converted by said thinning means are f1, f2, f3 and f4, respectively, where 1fH is a horizontal synchronizing signal frequency of video signal.

21. The tracking device claimed in claim 20, wherein said thinning means comprises a 1/29 thinning circuit, a 1/25 thinning circuit, a 1/20 thinning circuit and a 1/18 thinning circuit and said digital filter means comprises four 1fH band pass filters connected to said 1/29, 1/25, 1/20 and 1/18 thinning circuits, respectively.

22. The tracking device claimed in claim 20, wherein said thinning means comprises a 1/25 thinning circuit and a 1/18 thinning circuit and said digital filter means comprises two sets of band pass filters, each set including a 1fH band pass filter and a 3fH band pass filter, said sets being connected to said 1/25 thinning circuit and said 1/18 thinning circuit, respectively.

23. The tracking device claimed in claim 20, wherein said thinning means comprises a 1/29 thinning circuit and a 1/20 thinning circuit and said digital filter means comprises two sets of band pass filters, each set including a 1fH band pass filter and a 3fH band pass filter, said sets being connected to said 1/29 thinning circuit and said 1/20 thinning circuit, respectively.

24. The tracking device claimed in claim 15, further comprising a digital low-pass filter provided between said analog to digital converter and said thinning means.

25. The tracking device claimed in claim 15, further comprising coefficient circuit means connected to said digital filter means for compensating for said level variation of said reproduced pilot signals.

26. The tracking device claimed in claim 4 or 15, wherein the plurality of said pilot signals comprise four-frequency pilot signals having frequencies f1, f2, f3 and f4 corresponding to 189fH/29, 189fH/25, 189fH/18 and 189fH/20, respectively, where 1fH is a horizontal synchronizing signal frequency of video signal.

27. The tracking device claimed in claim 4 or 15, wherein said digital filter means comprises a band pass filter of quadratic infinite impulse response type.

28. The tracking device claimed in claim 4 or 15, wherein said digital filter means comprises:
   memory means for storing a first, second and third coefficients for each of said pilot signals;
   an adder having a first input connected to an output of said analog to digital converter;
   a first delay circuit for delaying an output of said adder;
   a second delay circuit for delaying an output of said first delay circuit;
   a subtracter for subtracting an output of said second delay circuit from the output of said adder to provide a difference therebetween;
   a first coefficient circuit for multiplying said difference with the first coefficient stored in said memory means;
   a second coefficient circuit for multiplying the output of said second delay circuit with the second coefficient stored in said memory means and supplying a result to a second input of said adder; and
   a third coefficient circuit for multiplying the output of said first delay circuit with the third coefficient stored in said memory means.

29. The tracking device claimed in claim 28, wherein said first and said second delay circuits comprise latch circuits, respectively 30. The tracking device claimed in claim 28, further comprising means for suppressing the pilot signal reproduced from a track under scan.

31. The tracking device claimed in claim 36, wherein said suppressing means comprises a feedback circuit composed of a subtracter arranged between said low-pass filter and said analog to digital conversion means, another low-pass filter and a digital to analog converter means, said another low-pass filter and said digital to analog converter means being connected in series and arranged between said subtracter and an output of said analog to digital converter means.

32. The tracking device claimed in claim 4 or 15, wherein said feedback means comprises level detector means connected to said digital filter means, said level detector means comprising a comparator for comparing a level of a preceding output of said digital filter means with that of a current output of said digital filter means, a latch circuit for latching a current output of said digital filter means when the current output is larger than the preceding output and another latch circuit for latching and outputting the preceding output of said digital filter means when said latch circuit is reset.

33. A tracking device for use in a magnetic recording and reproducing apparatus including a magnetic recording medium having tracks formed by helical scan and recorded with a plurality of pilot signals having frequencies mutually different by an amount smaller than twice a frequency of an adjacent pilot signal together with information signals sequentially and circulatingly, for performing, in reproduction, a tracking control according to the pilot signals reproduced, said tracking device comprising:
   an analog to digital conversion means for converting the reproduced pilot signals into digital signals by sampling the reproduced pilot signals at sampling frequency lower than twice a frequency of the reproduced pilot signal;
   filter means for deriving an aliasing signal of the reproduced pilot signal converted into the digital signal by said analog to digital conversion means; and
   means for generating a tracking control signal from an aliasing signal of the reproduced pilot signal produced by said sampling means to control a tracking control actuator of the recording and reproducing apparatus.

* * * * *